United States Patent
Yanagisawa

[11] Patent Number: 5,983,845
[45] Date of Patent: Nov. 16, 1999

[54] ROTATIONAL MOTION MECHANISM AND ENGINE

[75] Inventor: Ken Yanagisawa, Matsumoto, Japan

[73] Assignee: Yugen Kaisha Sozoan, Nagano, Japan

[21] Appl. No.: 09/000,374

[22] PCT Filed: Jul. 18, 1997

[86] PCT No.: PCT/JP97/02521

§ 371 Date: Jan. 29, 1998

§ 102(e) Date: Jan. 29, 1998

[87] PCT Pub. No.: WO98/04821

PCT Pub. Date: Feb. 5, 1998

[30] Foreign Application Priority Data

Jul. 26, 1996 [JP] Japan .................................... 8-197196
Jan. 10, 1997 [JP] Japan .................................... 9-002991
May 28, 1997 [JP] Japan .................................... 9-138617

[51] Int. Cl.⁶ ............................ F02B 75/32; F02B 75/24; F16H 21/16
[52] U.S. Cl. ............... 123/53.1; 123/197.1; 123/DIG. 8; 74/50; 92/68
[58] Field of Search .............................. 123/197.1, 197.2, 123/197.3, 197.4, 197.5, 53.3, 53.5, DIG. 8, 53.1, 53.4, 55.2, 55.5; 74/50; 92/68

[56] References Cited

U.S. PATENT DOCUMENTS 852,033   4/1907  Philippe .
877,294   1/1908  Chase .
3,520,285 7/1970  Klauder ....................................... 123/56
4,682,569 7/1987  Stiller et al. ............................ 123/55 A
4,685,342 8/1987  Brackett ....................................... 74/50
5,033,940 7/1991  Baumann ................................. 417/273
5,503,038 4/1996  Aquino et al. ............................... 74/49
5,655,406 8/1997  Yanagisawa .

FOREIGN PATENT DOCUMENTS 7-12199  1/1995  Japan .

Primary Examiner—Willis R. Wolfe
Assistant Examiner—Brian Hairston
Attorney, Agent, or Firm—Birch, Stewart, Kolasch & Birch, LLP

[57] ABSTRACT

An object of the present invention is to provide a rotary drive system and an engine which have greater toughness and which are capable of smoothly converting linear thrust force into rotary torque. In the present invention, a pair of elongated members are arranged parallel in a first direction. A moving guide is spanned between the elongated members, arranged in a second direction perpendicular to the first direction, and capable of moving in the first direction. A moving body is capable of moving in the second direction along the moving guide. A rotary shaft is capable of rotating about an axial line, which is perpendicular to the first direction and the second direction. A lever has one part, which is pivotably connected with the moving body, and another part, which is fixed to the rotary shaft, whereby the lever rotates the rotary shaft when the moving body moves round. A driving mechanism moves the moving guide in the first direction. A control mechanism stabilizes rotational speed of the rotary shaft.

18 Claims, 16 Drawing Sheets

FIG.6
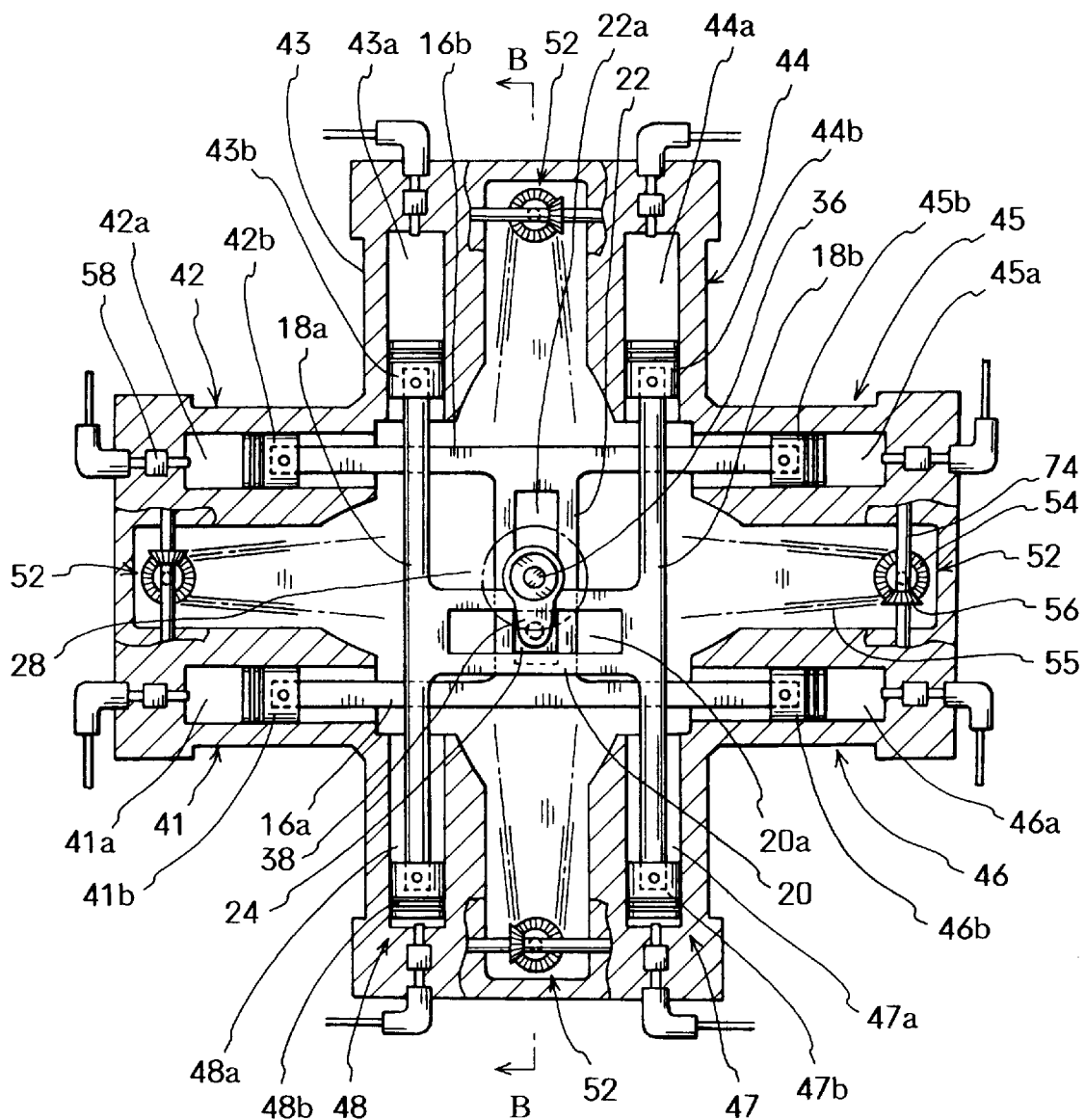
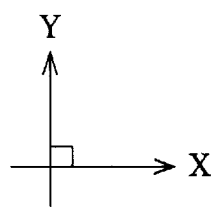

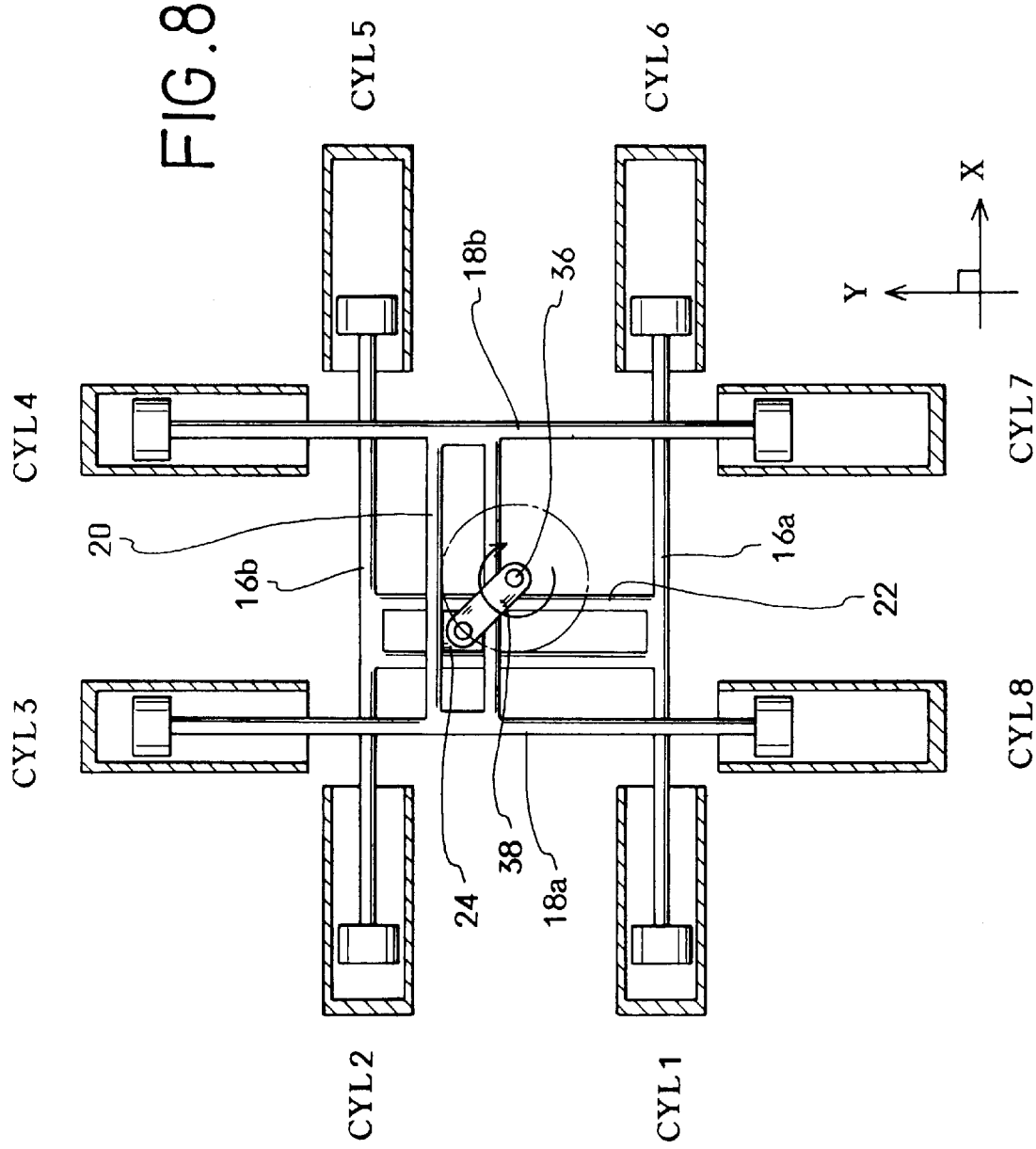

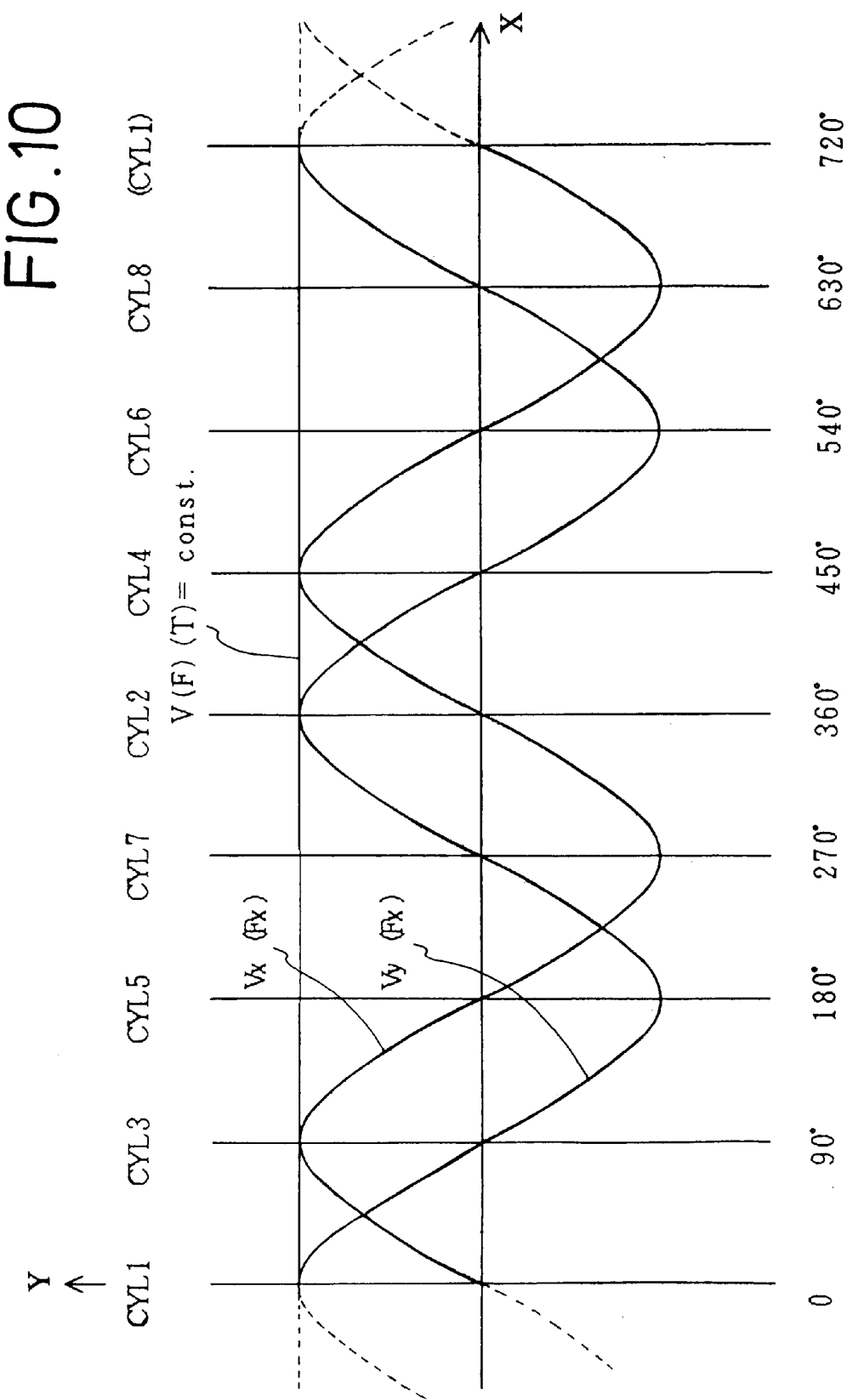

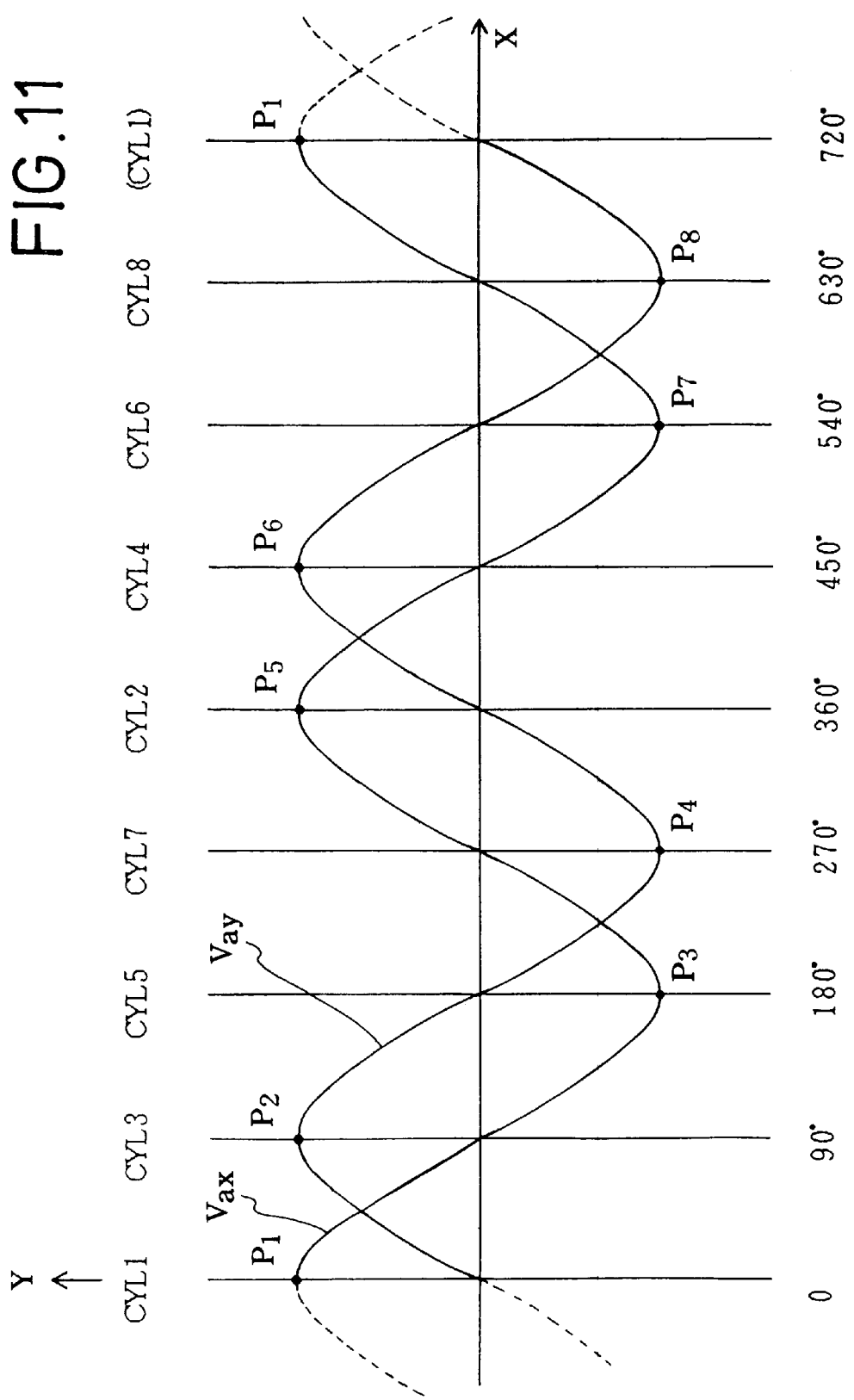

5,983,845

ROTATIONAL MOTION MECHANISM AND ENGINE

FIELD OF TECHNOLOGY

The present invention relates to a rotary drive system and an engine, more precisely relates to a rotary drive system and an engine, which convert linear movement into rotation.

BACKGROUND OF TECHNOLOGY

Recipro-engines and hydraulic motors, for example, have been used as mechanisms for converting linear movement into rotation. In the conventional converting mechanisms, thrust force of a piston, which linearly moves in cylinders, is converted into rotation of a crank shaft.

The conventional mechanisms, e.g., the recipro engines, the oil motors, the have following disadvantages. Firstly, the piston and the crank shaft are connected by a connecting rod. One end of the connecting rod is pivotably connected with the piston, so they mutually incline while in operation. The connecting rod and the crank are also pivotably connected by a piston pin, so they mutually incline while in operation. When the connecting rod inclines with respect to the piston and the crank shaft, 100% of the thrust force of the piston cannot be transmitted to the crank shaft. Namely, component force in the tangent direction of the crank shaft, which is divided from component force of the thrust force toward the connecting rod, is transmitted to the crank shaft, so that transmitting loss is great. Thus, the rotary torque of the crank shaft is quite lower with respect to the linear thrust force of the piston; efficiency of converting the linear thrust force into the rotary torque is low.

Secondly, the crank shaft rotates at fixed speed when the linear movement of the piston is converted into the rotation of the crank shaft, so the speed of the piston is faster near an upper dead point and slower near a lower dead point. Thus, vibration is apt to happen. This point will be explained with reference to FIGS. 20 and 21.

FIG. 20 is an explanation view showing an example of the conventional crank mechanism including the connecting rod.

In this example, stroke "S" of the piston 110 is 40 mm; length of the connecting rod 120 is 50 mm. A connecting section 125 of the crank 130 and the connecting rod 120 are located at a 0° position "L", which is the furthest position from a cylinder 140, when the piston 110 is at the lower dead point $P_1$. If the crank 130 turns 90° from the 0° position "L", the connecting section is at a 90° position "M"; the connecting section is at a 180° position "H", when the crank 130 turns 180° and the piston 110 locates at the upper dead point $P_2$.

FIG. 21 is a graph showing relationship (a solid line) between the rotational angle $X_c$ (degree) of the crank 130 and a position $Y_p$ (mm) on the stroke of the piston 110 of the example shown in FIG. 20. Note that, a one-dot-chain line shows a sine wave.

When the crank 130 is at the 0° position "L", the piston 110 is at the lower dead point $P_1$, so the position $Y_p$ (mm) of the piston 110 is 0 mm; when the crank 130 is at the 180° position "H", the piston 110 is at the upper dead point $P_2$, so the position $Y_p$ (mm) of the piston is 40 mm.

When the piston 110 moves from the lower dead point $P_1$ to the upper dead point $P_2$, the crank 130 turns from the 0° position "L" to the 90° position "M", and the piston 110 moves 15.83 mm. When the crank 130 turns from the 90° position "M" to the 180° position "H", the piston 110 moves 24.17 mm. Namely, the speed of the piston 110 is faster near the upper dead point $P_2$ and slower near the lower dead point $P_1$. So it is difficult to stably rotate the crank shaft, and a vibration is likely to occur. Near the upper dead point $P_2$, fuel is ignited and burnt, but the speed of the piston is fast, so that it is difficult to ignite at proper timing. With this untimely ignition, the efficiency of the conventional crank mechanism is limited, and noise cannot be reduced.

To improve above described disadvantages, the inventor of the present invention has invented a rotary drive system (Japanese Patent Kokai Gazette No. 7-12199) shown in FIGS. 22 and 23. The structure of the rotary drive system will be explained.

The rotary drive system comprises: a pair of first elongated members 16a and 16b being arranged parallel in a first direction; a pair of second elongated members 18a and 18b being arranged parallel in a second direction perpendicular to the first direction; a first rod 20 being arranged parallel to the first elongated members 16a and 16b and capable of moving in the second direction in a state of being parallel to the first elongated members 16a and 16b; a second rod 22 being arranged parallel to the second elongated members 18a and 18b and capable of moving in the first direction in a state of being parallel to the second elongated members 18a and 18b; a moving body 24 being capable of moving in the first direction and the second direction along the first rod 20 and the second rod 22 in a rectangular plane 28 enclosed by the first elongated members 16a and 16b and the second elongated members 18a and 18b; a first driving mechanism 26a–d for moving the second rod 22 in the first direction; a second driving mechanism 34a–d for moving the first rod 20 in the second direction; rotary shafts 36a and 36b being capable of rotating about axial lines; and levers 38a and 38b whose one ends are pivotably connected with the moving body 24 and whose the other ends are fixed to one of the rotary shafts 36a and 36b, whereby the levers rotate the rotary shafts 36a and 36b when the moving body 24 moves round the rotary shafts 36a and 36b.

In the rotary drive system, the one ends of the levers 38a and 38b are pivotably connected with the moving body 24; the other ends thereof are fixed to one of the rotary shafts 36a and 36b, which are capable of rotating about the axial lines. So the rotary shafts 36a and 36b are rotated about their axial lines when the moving body 24 moves round the rotary shafts 36a and 36b. With this structure, the rotary drive system can convert the linear thrust force into the rotary torque without employing the conventional connecting rod, so that the converting efficiency can be improved and reducing the vibration.

TECHNICAL PROBLEMS

However, the rotary drive system disclosed in the Japanese Patent Kokai Gazette No. 7-12199 has complex structures, e.g., the first driving mechanisms and the second driving mechanism for generating the linear thrust force in the first direction and the second direction.

Further, it has no mechanism for efficiently converting the linear thrust force into the rotary torque.

DISCLOSURE OF THE INVENTION

An object of the present invention is to provide a rotary drive system and an engine which are capable of improving the efficiency and reducing vibration and which have simple structures.

Another object of the present invention is to provide a rotary drive system and an engine which have greater toughness and which are capable of smoothly converting linear thrust force into rotary torque.

To achieve the objects, the present invention has following structures.

A first basic structure of the invention is a rotary drive system comprising:

a pair of elongated members being arranged parallel in a first direction;

a moving guide being spanned between the elongated members, the moving guide being arranged in a second direction perpendicular to the first direction, the moving guide being capable of moving in the first direction;

a single moving body being capable of moving in the second direction along the moving guide;

a rotary shaft being capable of rotating about an axial line, which is perpendicular to the first direction and the second dirction;

a lever whose one part is pivotably connected with the moving body and whose another part is fixed to the rotary shaft, whereby the lever rotates the rotary shaft when the single moving body moves round;

a driving mechanism for moving the moving guide in the first direction; and a control mechanism for stabilizing rotational speed of the rotary shaft.

In the rotary drive system, the driving mechanism may include a cylinder unit, which has: an inlet valve for opening and closing an introducing part, which introduces a fluid into the cylinder unit; and an outlet valve for opening and closing a discharging part, which discharges the fluid therefrom.

In the rotary drive system, the control mechanism may be a counter weight and/or a flywheel.

In the rotary drive system, the single moving body may be moved, in the second direction, in a frame which is provided to the moving guide and elongated in the second direction.

A second basic structure of the invention is a rotary drive system comprising:

a pair of first elongated members being arranged parallel in a first direction;

a pair of second elongated members being arranged parallel in a second direction perpendicular to the first direction;

a first moving guide being spanned between the second elongated members, the first moving guide being arranged in the first direction, the first moving guide being capable of moving in the second direction;

a second moving guide being spanned between the first elongated members, the second moving guide being arranged in the second direction, the second moving guide being capable of moving in the first direction;

a moving body being capable of moving in the first direction in a first frame, which is provided to the first moving guide and elongated in the first direction, and moving in the second direction in a second frame, which is provided to the second moving guide and elongated in the second direction, whereby the moving body is capable of moving in a rectangular plane enclosed by the first elongated members and the second elongated members;

a rotary shaft being capable of rotating about an axial line, which is perpendicular to the first direction and the second dirction;

a lever whose one part is pivotably connected with the moving body and whose another part is fixed to the rotary shaft, whereby the lever rotates the rotary shaft when the moving body moves round;

a first driving mechanism for moving the second moving guide in the first direction; and a second driving mechanism for moving the first moving guide in the second direction.

In the rotary drive system, the first driving mechanism and the second driving mechanism may respectively include cylinder units, each of which has: an inlet valve for opening and closing an introducing part, which introduces a fluid into the cylinder unit; and an outlet valve for opening and closing a discharging part, which discharges the fluid therefrom.

In the rotary drive system, the cylinder units may discharge the fluid when the rotary shaft is rotated by the round movement of the moving body.

A rotary drive system may comprise a plurality of sub-rotary drive systems, each of which is above described rotary drive system of the present invention, wherein the sub-rotary drive systems are piled and whose rotary shafts are coaxially connected.

In the rotary drive system, the sub-rotary drive systems may be piled to arrange the pairs of elongated members parallel, and angular positions of the levers, with respect to the coaxial rotary shafts, are mutually different.

In the rotary drive system, a couple of the sub-rotary drive systems may be piled in which the difference of the angular positions of the levers is 180°.

A third basic structure of the invention is an engine comprising:

a pair of elongated members being arranged parallel in a first direction, the elongated members being capable of moving in the first direction;

a moving guide being arranged in a second direction perpendicular to the first direction, whose both ends are respectively fixed to the elongated members, whereby the moving guide is moved in the first direction together with the elongated members;

a single moving body being capable of moving in the second direction along the moving guide;

a rotary shaft being capable of rotating about an axial line, which is perpendicular to the first direction and the second dirction;

a lever whose one part is pivotably connected with the single moving body and whose another part is fixed to the rotary shaft, whereby the lever rotates the rotary shaft when the single moving body moves round;

a driving mechanism for moving the moving guide in the first direction; and a control mechanism for stabilizing rotational speed of the rotary shaft, wherein the driving mechanism includes cylinder units, which are driven by fluid pressure, each of which is connected with each end of the elongated members, and which are capable of moving the elongated members and the moving guide in the first direction.

In the engine, the control mechanism may be a counter weight and/or a flywheel.

In the engine, the moving body may be moved, in the second direction, in a frame which is provided to the moving guide and elongated in the second direction.

In the engine, the cylinder units may be a first cylinder unit and a second cylinder unit, which are respectively connected with one ends of the elongated members, and a fifth cylinder unit and a sixth cylinder unit, which are respectively connected with the other ends of the elongated members, wherein the cylinder units are repeatedly actuated in order of the first cylinder unit, the fifth cylinder unit, the second cylinder unit and the sixth cylinder unit.

A fourth basic structure of the invention is an engine comprising:

a pair of first elongated members being arranged parallel in a first direction;

a pair of second elongated members being arranged parallel in a second direction perpendicular to the first direction;

a first moving guide being arranged in the first direction, whose both ends are respectively fixed to the second elongated members, whereby the first moving guide is moved in the second direction together with the second elongated members;

a second moving guide being arranged in the second direction, whose both ends are respectively fixed to the first elongated members, whereby the second moving guide is moved in the first direction together with the first elongated members;

a moving body being capable of moving in the first direction in a first frame, which is provided to the first moving guide and elongated in the first direction, and moving in the second direction in a second frame, which is provided to the second moving guide and elongated in the second direction, whereby the moving body is capable of moving in a rectangular plane enclosed by the first elongated members and the second elongated members;

a rotary shaft being capable of rotating about an axial line, which is perpendicular to the first direction and the second dirction;

a lever whose one part is pivotably connected with the moving body and whose another part is fixed to the rotary shaft, whereby the lever rotates the rotary shaft when the moving body moves round;

a first driving mechanism for moving the second moving guide in the first direction; and a second driving mechanism for moving the first moving guide in the second direction, wherein the first driving mechanism and the second driving mechanism include cylinder units, which are driven by fluid pressure, and wherein each of the cylinder units is connected with each end of the first elongated members and the second elongated members, the cylinder units move the first elongated members and the second moving guide in the first direction and move the second elongated members and the first moving guide in the second direction.

An engine may comprise a plurality of sub-engine, each of which is above described engine of the present invention, wherein the sub-engines are piled and whose rotary shafts are coaxially connected.

In the engine, the sub-engine may be piled to arrange the pairs of elongated members parallel, wherein angular positions of the levers, with respect to the coaxial rotary shafts, are mutually different.

In the engine, a couple of the engines may be piled, wherein the difference of the angular positions of the levers is 180°, and phase difference of actuating the sub-engines is 180°.

A fifth basic structure of the present invention is an engine comprising:

a pair of first elongated members being arranged parallel in a first direction, the first elongated members being capable of moving in the first direction;

a pair of second elongated members being arranged parallel in a second direction perpendicular to the first direction, the second elongated members being capable of moving in the second direction;

a first moving guide being arranged in the first direction, whose both ends are respectively fixed to the second elongated members, whereby the first moving guide is moved in the second direction together with the second elongated members;

a second moving guide being arranged in the second direction, whose both ends are respectively fixed to the first elongated members, whereby the second moving guide is moved in the first direction together with the first elongated members;

a moving body being capable of moving in the first direction along the and moving in the second direction along the second moving guide, the moving body moving in a rectangular plane enclosed by the first elongated members and the second elongated members;

a rotary shaft being capable of rotating about an axial line, which is perpendicular to the first direction and the second dirction;

a lever whose one part is pivotably connected with the moving body and whose another part is fixed to the rotary shaft, whereby the lever rotates the rotary shaft when the moving body moves round;

a first driving mechanism for moving the second moving guide in the first direction; and a second driving mechanism for moving the first moving guide in the second direction, wherein the first driving mechanism and the second driving mechanism include cylinder units, which are driven by fluid pressure, wherein each of the cylinder units is connected with each end of the first elongated members and the second elongated members, the cylinder units move the first elongated members and the second moving guide in the first direction and move the second elongated members and the first moving guide in the second direction, and wherein the cylinder units are: a first cylinder unit and a second cylinder unit, which are respectively connected with one ends of the first elongated members; a third cylinder unit and a fourth cylinder unit, which are respectively connected with one ends of the second elongated members; a fifth cylinder unit and a sixth cylinder unit, which are respectively connected with the other ends of the first elongated members; and a seventh cylinder unit and a eighth cylinder unit, which are respectively connected with the other ends of the second elongated members, and the cylinder units are repeatedly actuated by an ignition mechanism in order of the first cylinder unit, the third cylinder unit, the fifth cylinder unit, the seventh cylinder unit, the second cylinder unit, the fourth cylinder unit, the sixth cylinder unit and the eighth cylinder unit.

A sixth basic structure of the invention is an engine comprising:

a pair of first elongated members being arranged parallel in a first direction, the first elongated members being capable of moving in the first direction;

a pair of second elongated members being arranged parallel in a second direction perpendicular to the first direction, the second elongated members being capable of moving in the second direction;

a first moving guide being arranged in the first direction, whose both ends are respectively fixed to the second elongated members, whereby the first moving guide is moved in the second direction together with the second elongated members;

a second moving guide being arranged in the second direction, whose both ends are respectively fixed to the first elongated members, whereby the second moving guide is moved in the first direction together with the first elongated members;

a moving body being capable of moving in the first direction along the first moving guide and moving in the second direction along the second moving guide, the moving body moving in a rectangular plane enclosed by the first elongated members and the second elongated members;

a rotary shaft being capable of rotating about an axial line, which is perpendicular to the first direction and the second dirction;

a lever whose one part is pivotably connected with the moving body and whose another part is fixed to the rotary shaft, whereby the lever rotates the rotary shaft when the moving body moves round;

a first driving mechanism for moving the second moving guide in the first direction; and a second driving mechanism for moving the first moving guide in the second direction, wherein the first driving mechanism and the second driving mechanism include cylinder units, which are driven by fluid pressure, wherein each of the cylinder units is connected with each end of the first elongated members and the second elongated members, the cylinder units move the first elongated members and the second moving guide in the first direction and move the second elongated members and the first moving guide in the second direction, and wherein the cylinder units are: a first cylinder unit and a second cylinder unit, which are respectively connected with one ends of the first elongated members; a third cylinder unit and a fourth cylinder unit, which are respectively connected with one ends of the second elongated members; a fifth cylinder unit and a sixth cylinder unit, which are respectively connected with the other ends of the first elongated members; and a seventh cylinder unit and a eighth cylinder unit, which are respectively connected with the other ends of the second elongated members, and the cylinder units are repeatedly actuated by an ignition mechanism in order of: the first cylinder unit and the second cylinder unit; the third cylinder unit and the fourth cylinder unit; the fifth cylinder unit and the sixth cylinder unit; and the seventh cylinder unit and the eighth cylinder unit.

In the rotary drive system of the present invention, no connecting rod, which is employed in the conventional crank mechanism, is required, and the rotary shaft can be rotated at fixed speed by sine-wave movement of the moving guide in the first direction. The sine-wave movement is stable reciprocative movement, so vibration can be reduced.

In the first basic structure, the rotary drive system has a simple structure, and the linear thrust force can be smoothly converted into the rotation by employing the control mechanism. By the smooth conversion, converting efficiency of the system can be improved, and noise can be reduced in spite of the simple structure.

By moving the moving body in the frame which is provided to the moving guide, the moving body, which is driven by the thrust force to rotate the rotary shaft, is supported by the frame, so the moving body can be smoothly moved in the frame. Thus, the linear thrust force can be further smoothly converted into the rotation. By the smooth conversion, converting efficiency can be further improved.

BRIEF DESCRIPTION OF THE DRAWINGS

FIG. 6 is a plan sectional view showing an inner mechanism of an engine of Second Embodiment;

FIG. 8 is an explanation view showing a rotation mechanism of the Second Embodiment;

FIG. 10 is a graph showing relationship between rotational angle of a crank and speed of a piston;

FIG. 11 is a graph showing relationship between rotational angle of a crank and acceleration of the piston;

EMBODIMENTS OF THE INVENTION

Preferred embodiments of the present invention will now be described in detail with reference to the accompanying drawings.

(First Embodiment)

First Embodiment will be explained with reference to FIGS. 1–5.

Figure 1:
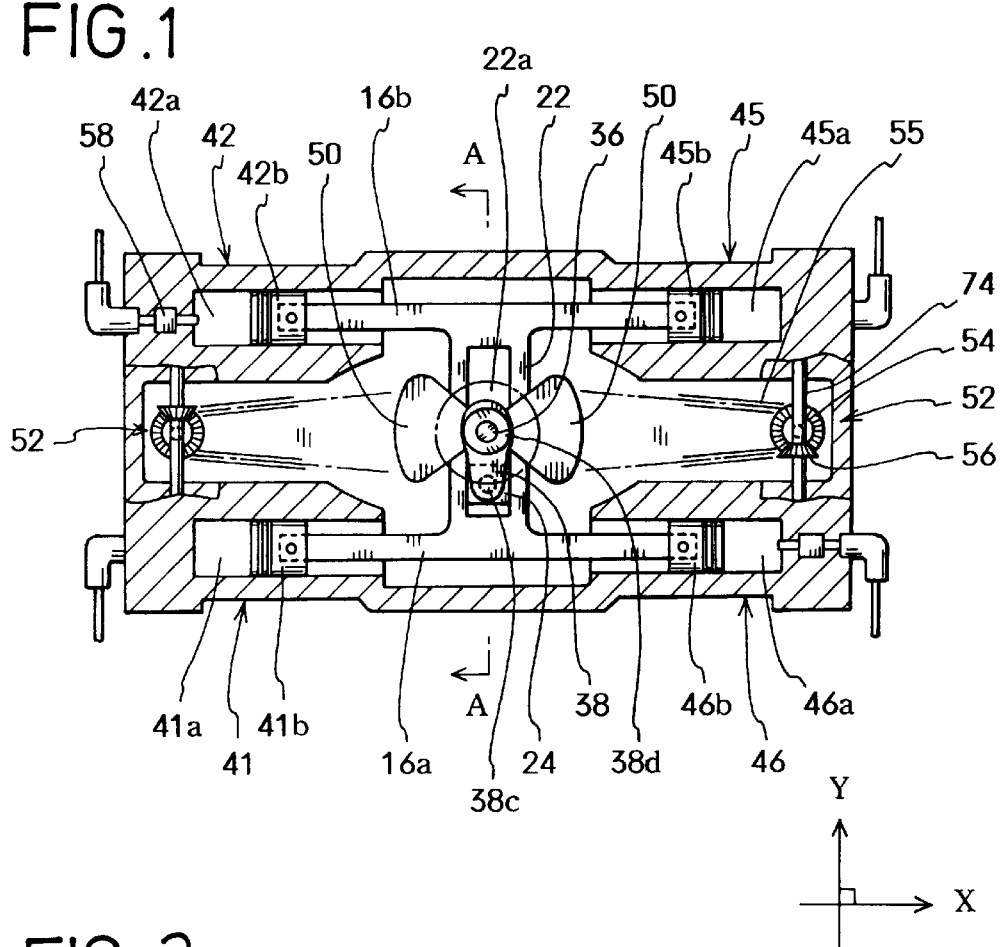
FIG. 1 is a plan sectional view of an engine of First Embodiment of the present invention.
Figure 2:
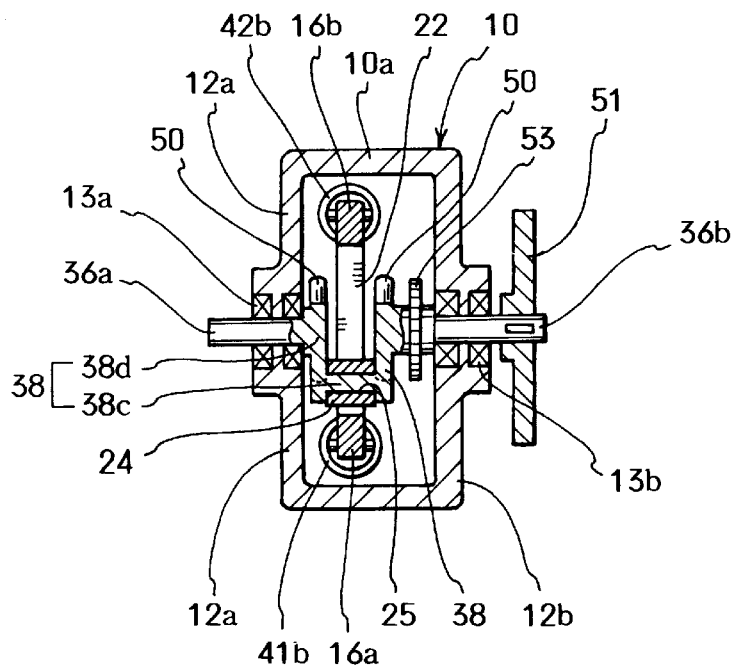
FIG. 2 is a sectional view of the First Embodiment taken along a line A—A.
Figure 3:
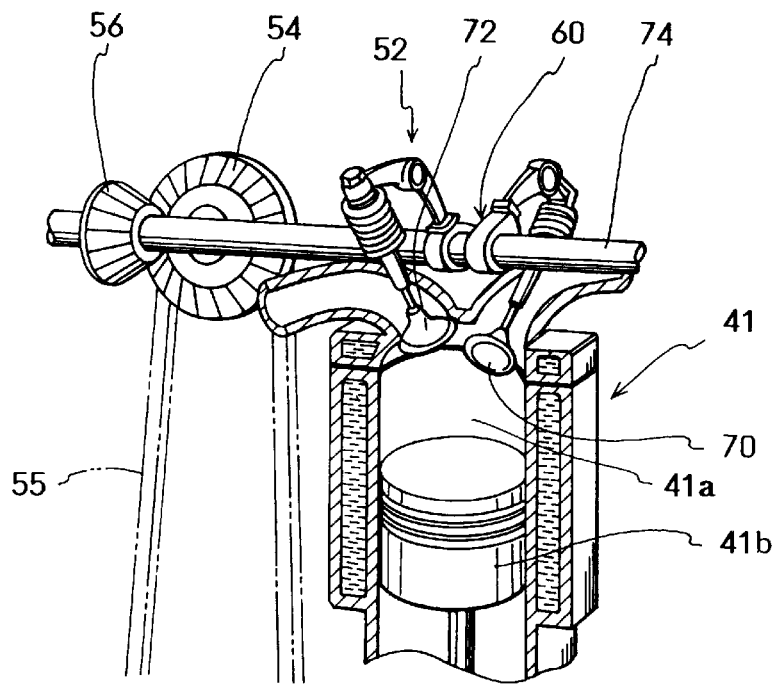
FIG. 3 is an explanation view showing a cylinder head of the First Embodiment.

FIG. 1 is a plan sectional view of a rotary drive system (an engine) of the First Embodiment, which shows an inner mechanism; FIG. 2 is a sectional view taken along a line A—A shown in FIG. 1. And FIG. 3 is an explanation view showing a cylinder head.

A casing 10 includes a side wall section 10a and an upper and lower covers 12a and 12b.

A pair of X-piston rods 16a and 16b are arranged parallel in a first direction (an X-direction) and act as a pair of elongated members. The X-piston rods 16a and 16b are capable of moving in the X-direction.

A Y-moving guide 22 is spanned between the X-piston rods 16a and 16b and arranged in a second direction (a Y-direction) perpendicular to the first direction (the X-direction), and each end is respectively fixed to the X-piston rods 16a and 16b. The Y-moving guide 22 is integrated with the X-piston rods 16a and 16b to form a H-shaped structure. Thus, the Y-moving guide is moved in the X-direction, in a state of being parallel to the Y-axis, together with the X-piston rods 16a and 16b by the movement of the X-piston rods 16a and 16b. The Y-moving guide 22 is formed into a hollow frame shape, and a moving body 24 can be moved, in the Y-direction, in the frame 22a.

The moving body 24 can be moved in the X-direction together with the Y-moving guide 22. The moving body 24 is a slider, which is capable of sliding in the frame 22a, and capable of moving in the Y-direction along the Y-moving guide 22. Thus, the moving body 24 is capable of executing two dimensional movement, in the X- and Y-directions, in a plane.

A rotary shaft 36 is capable of rotating about a vertical axial line perpendicular to the X- and Y-axes. The rotary shaft 36 is rotatably held by the casing 10. Concretely, the rotary shaft 36 is rotatably held by ball bearings (an upper and a lower ball bearings 13a and 13b), so it is capable of rotating, with respect to the casing 10, about the axial line. End sections of the rotary shaft 36 are respectively projected from the upper and lower covers 12a and 12b, so they can be connected with an external member or members (not shown) to be rotated.

Levers 38 have end sections 38c, each of which is pivotably connected to the moving body 24, and the other end sections 38d, each of which is fixed to the rotary shaft 36. When the moving body 24 moves round the rotary shaft without spinning, the rotary shaft 36 is rotated about own axial line. The end sections 38c of the levers 38 are rotatably pierced through a through-hole 25, which is formed in a center of the moving body 24; the other end sections 38d are integrated with the rotary shaft 36. Distance between the end sections 38c and the rotary shaft 36 is half of stroke of pistons 41b, 42b, 45b and 46b. The rotary shaft 36 has an upper section 36a, which is rotatably held by the upper ball bearing 13a, and a lower section 36b, which is connected to the upper ball bearing 13a by the levers 38 and rotatably held by the lower ball bearing 13b. The rotary shaft 38 is held at two parts, which are located on both sides of the levers 38 which transmit driving force of the moving body 24, so it can smoothly and stably rotate. Note that, in the First Embodiment, the rotary shaft 36 and the levers 38 are integrated to form a crank shape. The levers 38 are the upper lever and the lower lever, so they act as a crank arm. The end section 38c of each lever 38 is formed into a pin shape so as to act as a crank pin. Note that, distance between the end sections 38c and 38d is equal to radius of a circular orbit of the moving body 24.

Cylinder units 41, 42, 45 and 46 respectively have inlet valves for opening and closing introducing parts, which introduce a fluid into the cylinder units, and outlet valves or exhaust valves for opening and closing discharging parts, which discharge the fluid therefrom. The cylinder units 41, 42, 45 and 46 act as a driving mechanism for moving the Y-moving guide 22 in the X-direction. Cylinders 41a, 42a, 45a an 45a of the cylinder units 41, 42, 45 and 46 are combustion chambers of internal-combustion engines. The cylinder units 41, 42, 45 and 46 are respectively connected with each end of the X-piston rods 16a and 16b. The cylinders are the first cylinder 41a and the second cylinder 42a, which are located on the one end side of the X-piston rods 16a and 16b, and the fifth cylinder 45a and the sixth cylinder 46a, which are located on the other end side of the X-piston rods 16a and 16b. Each end of the X-piston rods 16a and 16b is connected each piston 41b, 42b, 45b and 46b. The pistons 41b, 42b, 45b and 46b respectively reciprocatively move in the cylinders 41a, 42a, 45a and 46a. By explosion of fuel in the cylinders 41a, 42a, 45a and 46a, the X-piston rods 16a and 16b are reciprocatively moved in the X-direction. The cylinders 41a, 42a, 45a and 46a moves the Y-guide 22, in the X-direction, together with the X-piston rods 16a and 16b. Note that, the X-piston rods 16a and 16b are elongated rods having circular sectional shapes, but the sectional shapes are not limited. The pistons 41b, 42b, 45b and 46b are respectively pivotably connected with the piston rods 16a and 16b by piston pins. Unlike the conventional crank mechanism having the connecting rod, the piston rods 16a and 16b are not required to turn, so the pistons 41b, 42b, 45b and 46b may be merely fixed to the piston rods 16a and 16b. For example, the pistons 41b, 42b, 45b and 46b may be respectively integrated with each end of the piston rods 16a and 16b.

Counter weights 50 and a flywheel 51 act as control mechanisms for stabilizing the rotational speed of the rotary shaft 36. The counter weights 50 are provided in the casing 10 and extended in the X-direction from the rotary shaft 36. The flywheel 51 is provided outside of the casing 10 and fixed to the rotary shaft 36. The counter weights 50 and the flywheel 51 store energy for rotation and generate proper component force, which moves the moving body 24 in the Y-direction, so that change of the rotational speed of the rotary shaft 36 can be small.

A valve driving mechanism 52 includes: a drive sprocket 53 fixed to the rotary shaft 36; a bevel gear 54 rotatably held by the casing 10; a timing chain 55 engaged between a driven sprocket 54a (see FIG. 7), which is fixed to a shaft of the bevel gear 54, and the drive sprocket 53; and a bevel gear 56, which is fixed to a cam shaft 74, and which engages with the bevel gear 54. With this structure, the cam shaft 74 is rotated by rotation of the rotary shaft 36. In the valve driving mechanism 52, the inlet valves 70 (see FIG. 3) and the outlet valves 72 (see FIG. 3) of the cylinder units 41, 42, 45 and 46 are driven by the driving force of the rotary shaft 36, which is transmitted by the cam shaft 74.

As shown in FIG. 3, cams 60 for introducing and discharging air are fixed to the cam shaft 74, and an inlet valve 70 and an outlet valve 72 are driven by valve springs, etc.. The ignition plugs 58 ignite the fuel in the cylinders 41a, 42a, 45a and 46a. This structure is the same as the conventional recipro-engines, so explanation will be omitted.

Note that, timing pulleys and a timing belt, etc. may be employed, as transmitting means, instead of the sprockets 53 and 54a and the timing chain 55.

An oil supplying mechanism is not shown in the First Embodiment. The oil supplying mechanism, which has a structure as well as the mechanism for rotating the cam shaft 74, actuates an oil pump by the driving force of the rotary shaft 36. The oil sent by the oil pump passes the X-piston rods 16a and 16b to supply into the cylinders 41a, 42a, 45a and 46a.

Successively, action of the engine of the First Embodiment will be explained with reference to FIGS. 4 and 5.

In the case of employing four-cycle engines as the cylinder units, a sucking step, a compressing step, a combustion step and a discharging step are executed in each engine while the rotary shaft 36 rotates twice. To rotate the rotary shaft 36 in the direction of an arrow shown in FIG. 4, the cylinder units are ignited in order of the first cylinder 41a (CYL1), the fifth cylinder 45a (CYL5), the second cylinder 42a (CYL2) and the sixth cylinder 46a (CYL6), wherein the cylinders are ignited in order with phase difference of 180°. They are ignited for each 180° of the rotational angle of the crank, so stable rotation can be gained.

Figure 5:
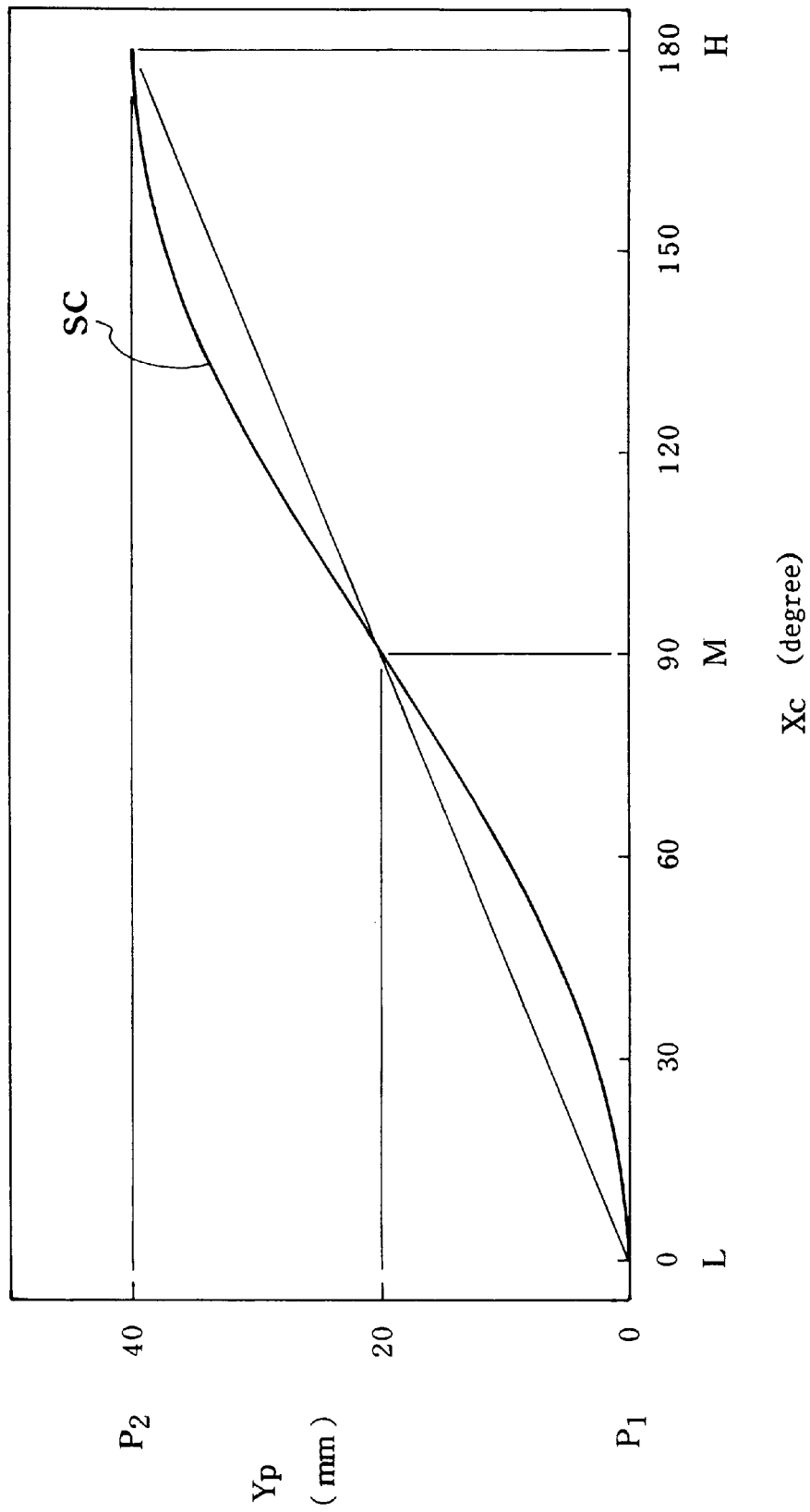
FIG. 5 is a graph showing relationship between rotational angle of a lever and movement of a piston of the First Embodiment.

The engine of the First Embodiment has no connecting rod which is required in the conventional recipro-engine, the pistons 41b, 42b, 45b and 46b execute sine movement shown in FIG. 5 while the rotary shaft 36 rotates at fixed speed. In the sine movement, moving patterns of the pistons 41b, 42b, 45b and 46b on the upper dead point side and on the lower dead point side are same. Thus, the pistons 41b, 42b, 45b and 46b can be executed smooth and stable reciprocative movement.

Figure 4:
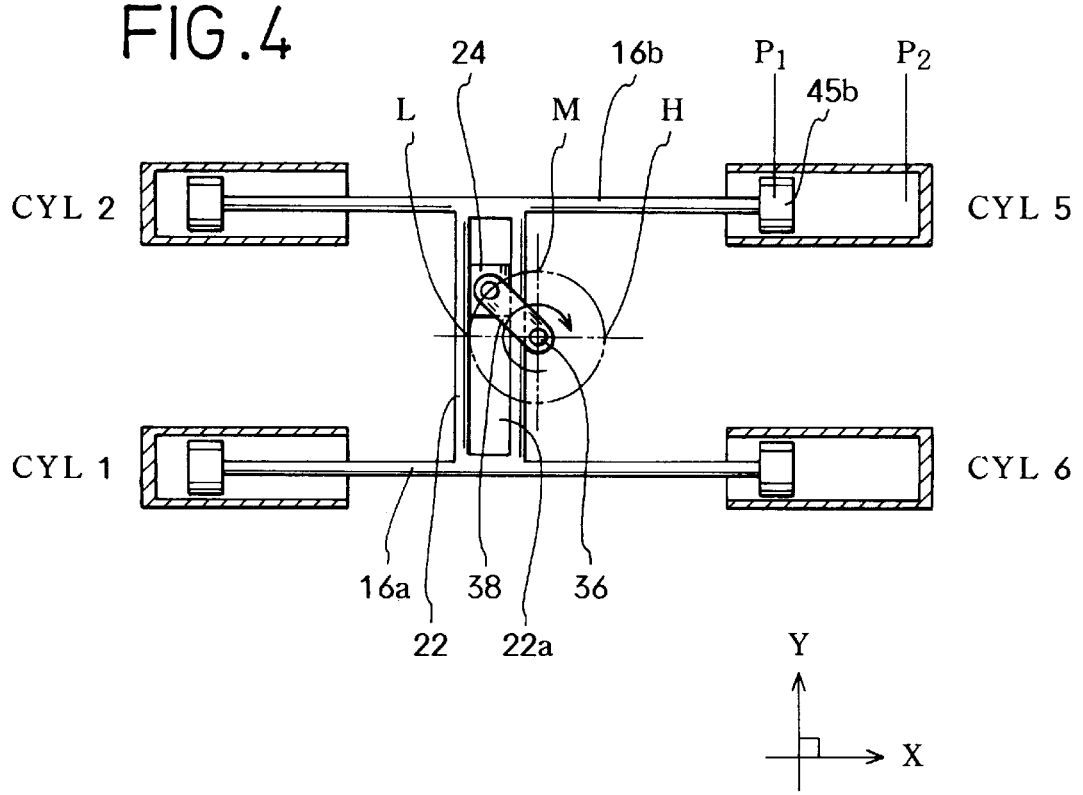
FIG. 4 is an explanation view showing a rotation mechanism of the First Embodiment.

FIG. 5 shows a graph SC, which indicates relationship between rotational angle Xc (degree) of the levers 38 and displacement Yp (mm) of the piston 45b shown in FIG. 4.

The displacement Yp (mm) on the stroke of the piston 45b is 0 mm when the levers 38 locate at the 0°-position "L" because the piston 45b locates at the lower dead point $P_1$. When the levers 38 locate at the 180°-position "H", it is 40 mm because the piston 45b locates at the upper dead point $P_2$.

While the piston 45b moves from the lower dead point $P_1$ to the upper dead point $P_2$, the levers 38 rotates from the 0°-position "L" to the 90°-position "M", so that the piston 45b moves 20 mm. While the levers 38 rotates from the 90°-position "M" to the 180°-position "H", the piston 45b further moves 20 mm. Namely, the displacement of the piston 45b on the upper dead point $P_2$ side and that on the lower dead point side $P_1$ side are equal.

With this structure, the stable rotation can be gained, and vibration in the drive system can be reduced. The combustion step is executed near the upper dead point $P_2$, and the speed of the piston is lower than that of the conventional crank mechanism having the connecting rod, so that the timing of the combustion step can be controlled properly.

In the rotary drive system (engine) of the First Embodiment, no conventional crank mechanism having the connecting rod is employed, so the rotary shaft 36 is rotated at fixed rotational speed by executing the sine wave movement of the Y-moving guide 22 in the X-direction. The sine wave movement is well balanced stable reciprocative movement, so that the vibration can be limited.

Thus, efficiency of the rotary drive system can be increased, and noise can be reduced, further reinforcing members are not required in the casing 10 due to less vibration so that it can be compact and light.

Structural elements are almost arranged in the same plane, so thickness of the system can be thinner, and maintenance can be easily executed by removing the cover or covers.

The Y-moving guide 22 are supported by a pair of X-piston rods 16a and 16b, so the moving body 24, which is moved with the Y-guide 22, is also supported by two sides. Namely, movable parts are supported by the two sides, they have greater toughness.

In the First Embodiment, the rotary drive system has four cylinder units 41, 42, 45 an 46, but a pair of the X-piston rods 16a and 16b (a pair of the elongated members) may be driven by two cylinder units, which are actuated by introducing and discharging high pressure fluid.

The Y-guide 22 may be slidably connected to the a pair of the guides 16a and 16b, and the Y-guide 22 may be driven by a cylinder unit.

Further, if the rotary shaft 36 is rotated by rotating means, the moving body 24 is moved round so that fluid can be discharged from the valves of the cylinder units 41, 42, 45 and 46, namely the rotary drive unit may be used as a pump, a compressor, etc..

(Second Embodiment)

Figure 7:
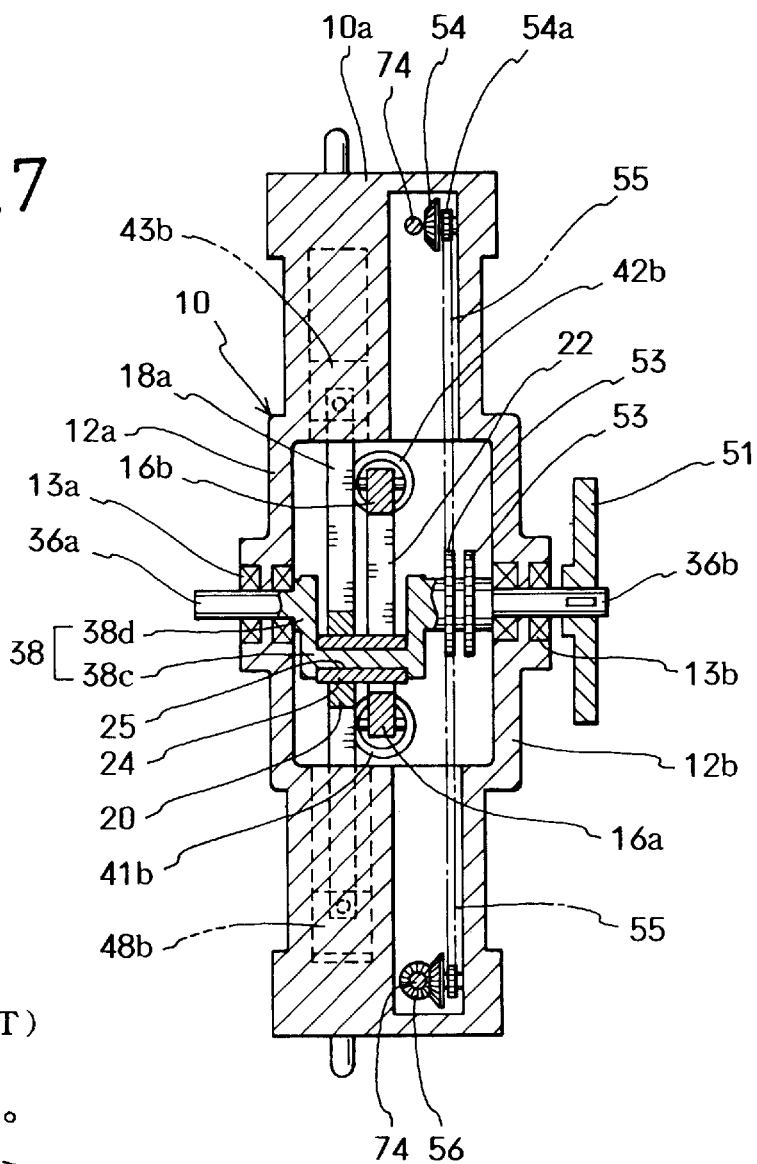
FIG. 7 is a sectional view of the Second Embodiment taken along a line B—B.

Second Embodiment will be explained with reference to FIGS. 6 and 7.

FIG. 6 is a plan sectional view of the rotary drive system (engine) of the present invention, which shows an inner mechanism; FIG. 7 is a sectional view taken along a line B—B shown in FIG. 6.

A casing 10 includes a side wall section 10a and an upper and a lower covers 12a and 12b. A rotary shaft 36 is rotatably held in the casing 10 with ball bearings.

A pair of X-piston rods 16a and 16b are arranged parallel in a first direction (an X-direction) and act as a pair of first elongated members. The X-piston rods 16a and 16b are capable of moving in the X-direction.

A pair of Y-piston rods 18a and 18b are arranged parallel in a second direction (an Y-direction), which is perpendicular to the first direction (the X-direction), and act as a pair of second elongated members. The Y-piston rods 18a and 18b are capable of moving in the Y-direction.

A X-moving guide 20 is arranged parallel to the X-piston rods 16a and 16b, and each end is respectively fixed to the Y-piston rods 18a and 18b. Thus, the X-moving guide 20 is moved in the Y-direction, in a state of being parallel to the X-piston rods 16a and 16b, by the movement of the Y-piston rods 18a and 18b in the Y-direction, so it acts as a first moving guide.

A Y-moving guide 22 is arranged parallel to the Y-piston rods 18a and 18b, and each end is respectively fixed to the X-piston rods 16a and 16b. Thus, the Y-moving guide 22 is moved in the X-direction, in a state of being parallel to the Y-piston rods 18a and 18b, by the movement of the X-piston rods 16a and 16b in the X-direction, so it acts as a second moving guide.

A moving body 24 is capable of sliding, in the X-direction, in a first frame 20a, which is provided to the X-moving guide 20 and arranged in the X-direction. And the moving body 24 is capable of sliding, in the Y-direction, in a second frame 22a, which is provided to the Y-moving guide 22 and arranged in the Y-direction. Thus, the moving body 24 is capable of moving a rectangular plane 28, which is enclosed by the X-piston rods 16a and 16b and the Y-piston rods 18a and 18b.

In the Second Embodiment, the X-moving guide 20 is located above the Y-moving guide 22. The moving body 24 is pierced through overlapped parts of the first frame 20a of the X-moving guide 20 and the second frame 22a of the Y-moving guide 22. Thus, the moving body 24 is driven by driving force from the X-moving guide 22 and the Y-moving guide 20, so that it is capable of smoothly executing two dimensional movement in the X- and Y-directions.

Cylinder units 41, 42, 45 and 46, which are internal-combustion engines, respectively have inlet valves for opening and closing introducing parts, which introduce a fluid into the cylinder units, and outlet valves for opening and closing discharging parts, which discharge the fluid there from. The cylinder units 41, 42, 45 and 46 act as a first driving mechanism for moving the Y-moving guide 22 in the X-direction.

Cylinder units 43, 44, 47 and 48, which are internal-combustion engines, respectively have inlet valves for opening and closing introducing parts, which introduce a fluid into the cylinder units, and outlet valves for opening and closing discharging parts, which discharge the fluid there from. The cylinder units 43, 44, 47 and 48 act as a second driving mechanism for moving the X-moving guide 20 in the Y-direction.

Cylinders 41a, 42a, 43a, 44a, 45a, 46a, 47a and 48a are combustion chambers of internal-combustion engines. The cylinder units 41, 42, 43, 44, 45, 46, 47 and 48 are respectively connected with each end of the X-piston rods 16a and 16b and the Y-piston rods 18a and 18b.

The cylinders are: the first cylinder 41a and the second cylinder 42a, which are respectively connected with one ends of the X-piston rods 16a and 16b; the third cylinder 43a and the fourth cylinder 44a, which are respectively connected with one ends of the Y-piston rods 18a and 18b; the fifth cylinder 45a and the sixth cylinder 46a, which are respectively connected with the other ends of the X-piston rods 16a and 16b; and the seventh cylinder 47a and the eighth cylinder 48a, which are respectively connected with the other ends of the Y-piston rods 18a and 18b.

Each end of the X-piston rods 16a and 16b and the Y-piston rods 18a and 18b is connected each piston 41b, 42b, 43b, 44b, 45b, 46b, 47b and 48b, and the pistons 41b, 42b, 43b, 44b, 45b, 46b, 47b and 48b are respectively reciprocatively moved in the cylinders 41a, 42a, 43a, 44a, 45a, 46a, 47a and 48a. By explosion of fuel in the cylinders 41a, 42a, 43a, 44a, 45a, 46a, 47a and 48a, the X-piston rods 16a and 16b are reciprocatively moved in the X-direction; the Y-piston rods 18a and 18b are reciprocatively moved in the Y-direction.

The cylinders 41a, 42a, 45a and 46a constitute a first driving mechanism; the cylinders 43a, 44a, 47a and 48a constitute a second driving mechanism. Thus, the Y-moving guide 22 is moved by the X-piston rods 16a and 16b; the X-moving guide 20 is moved by the Y-piston rods 18a and 18b.

Structures of a rotary shaft 36 and levers 38 are almost equal to the First Embodiment.

Structures of valve driving mechanisms, an oil supplying mechanism, etc. are also almost equal to the First Embodiment.

A flywheel 51 is provided outside of the casing 10 and fixed to the rotary shaft 36.

As clearly described above, the Second Embodiment includes a couple of the engines of the First Embodiment except the counter weights 50, and they are vertically piled and mutually shifted 90°.

Next, the action of the rotary drive system will be explained with reference to FIGS. 8–11.

Firstly, in the case of employing four-cycle engines as the cylinder units, a sucking step, a compressing step, a combustion step and a discharging step are executed in each engine while the rotary shaft 36 rotates twice. To rotate the rotary shaft 36 in the direction of an arrow shown in FIG. 8, the cylinder units are ignited in order of the first cylinder 41a (CYL1), the third cylinder 43a (CYL3), the fifth cylinder 45a (CYL5), the seventh cylinder 47a (CYL7), the second cylinder 42a (CYL2), the fourth cylinder 44a (CYL4), the sixth cylinder 46a (CYL6) and the eighth cylinder 48a (CYL8), wherein the cylinders are ignited in order with phase difference of 90°. They are ignited for each 90° of the rotational angle of the crank, so stable rotation can be gained.

In the case of employing two-cycle engines as the cylinder units, the cylinder units are ignited with the phase difference of 90° in order of CYL1, CYL3, CYL5, CYL7 or CYL2, CYL4, CYL6, CYL8. Namely, four of eight cylinder units are ignited. One of each pair of the cylinder units is ignited, so this example is proper for generating lower torque, idling, etc.. Note that, fuel is not supplied to the non-ignited cylinders so as not to execute the combustion steps.

In the case of the two-cycle engines, they may be ignited with the phase difference of 90° in order of: CYL1 and CYL2; CYL3 and CYL4; CYL5 and CYL6; CYL7 and CYL8, namely two cylinder units are simultaneously ignited so that greater torque can be gained.

Firstly, relationship between speed and torque will be explained.

Figure 9:
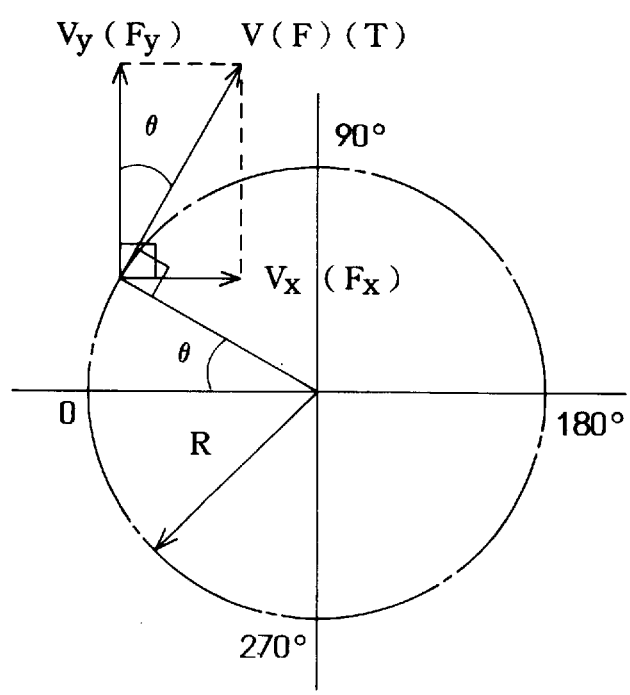
FIG. 9 is an explanation view showing vector of rotary torque generated in the Second Embodiment.

In FIG. 9, a symbol "V" indicates rotational speed; a symbol "V x" indicates piston speed in the X-direction; a symbol "V y" indicates piston speed in the Y-direction; a symbol "θ" indicates rotational angle of the crank; a symbol 1 "F" indicates rotational force; a symbol "F x" indicates thrust force of the piston in X-direction; a symbol "F y" indicates thrust force of the piston in Y-direction; a symbol "T" (T=F×R) indicates rotational torque; and a symbol "R" indicates radius of a rotational orbit of the crank.

As shown in FIG. 9, the speed in the X-direction V x=V sinθ; the speed in the Y-direction V y=V cosθ; the rotational speed, which is the combined speed of the both, is indicated as a following formula "F1".

$$V = \sqrt{Vx^2 + Vy^2} = \sqrt{(V\sin\theta)^2 + (V\cos\theta)^2} = V\sqrt{\sin\theta^2 + \cos\theta^2} = \text{constant} \quad \text{(F1)}$$

As described above, the rotational speed "V" is fixed. Namely, rotation at fixed speed can be gained.

The component forces of the rotational force "F" are F x=F sinθ and F y=F cosθ, so the rotational force indicated as a following formula "F2".

$$F = \sqrt{Fx^2 + Fy^2} = \sqrt{(F\sin\theta)^2 + (F\cos\theta)^2} = F\sqrt{\sin\theta^2 + \cos\theta^2} = \text{constant} \quad \text{(F2)}$$

As described above, the rotational force "F" is fixed. Namely, rotation at fixed force can be gained. And, the rotational torque "T" is Fx R=fixed value, so that the rotation is fixed torque rotation. FIG. 10 shows the relationship between the rotational angle (an X-axis) of the rotary shaft and the speed and thrust force (a Y-axis) of the piston. In the rotation of the rotary shaft 36 (the orbital movement of the moving body 24), the phase of the sine wave movement of the X-guide 20 is shifted 90° with respect to that of the Y-guide 22. Thus, the movement of the X-guide 20 and the Y-guide 22 are much stable movement.

Next, change of the speed of the piston will be explained.

The change of the speed of the piston means accelerating and reducing the speed of the piston, so it is differentiated value of the piston speed. A symbol "Vax" indicates the change of the piston speed in the X-direction; a symbol "Vay" indicates the change of the piston speed in the Y-direction, and they are indicated by following formulas "F3" and "F4".

$$Vax = \frac{d(Vx)}{d\theta} = \frac{d(V\sin\theta)}{d\theta} = V\cos\theta \quad (F3)$$

$$Vay = \frac{d(Vy)}{d\theta} = \frac{d(V\cos\theta)}{d\theta} = V\sin\theta \quad (F4)$$

FIG. 11 shows the relationship between the rotational angle (an X-axis) of the rotary shaft and the acceleration (a Y-axis) of the piston.

The rotary drive system (the engine) of the Second Embodiment is symmetry with respect to the X- and Y-axes. By the symmetrical mechanism, the rotary drive system is an ideal system. To rotate the rotary shaft at fixed speed and with fixed rotational torque, the phase of the sine wave movement of the pistons, which are arranged in the X-direction, and that of the pistons, which are arranged in the Y-direction, are mutually shifted 90°, so the combined movement of the pistons in the X- and Y-directions make the rotation at fixed speed (with fixed rotating force and fixed torque).

During the rotation of the rotary shaft at fixed speed and with fixed torque, the change of speed of the pistons, which are arranged in the X- and Y-directions, are indicated as the sine waves, so the ignition points P1–P8 of the CYLs 1–8 (see FIG. 11) meet the tops and bottoms of the sine waves. Namely, the well balanced rotation can be gained, and vibration can be reduced.

In the Second Embodiment, the flywheel 51 is attached, but the rotary drive system can generate the fixed rotation at fixed speed without the control mechanism, e.g., the flywheel 51, because the rotation is the combined movement of a couple of the sine wave movement whose phases are mutually shifted 90°.

The moving body 24 is well balanced and supported at four sides: two X-piston rods 16a and 16b and two Y-piston rods 18a and 18b. Thus, the vibration and noise of the rotary drive system can be reduced, and stable high speed operation can be realized.

In the rotary drive system, the linear thrust force of the X-piston rods 16a and 16b, in the X-direction, and the Y-piston rods 18a and 18b, in the Y-direction, are converted into the driving force for moving the moving body 24 round the rotary shaft without spinning, then the orbital movement of the moving body is converted into the rotation of the rotary shaft 36 by the levers 38. Power transmitting loss occurs at connecting sections, at which the moving body 24 and the levers 38 are pivotably connected, even if eight internal-combustion engines are employed, so that converting efficiency of converting the linear thrust force of the X-piston rods 16a and 16b and the Y-piston rods 18a and 18b into the rotary torque of the rotary shaft 36 can be higher.

Note that, in the case of rotating the rotary shaft 36 in the opposite direction, the cylinders CYL 1–8 are ignited in the reverse order.

The timing of igniting the cylinder units and actuating the inlet valves and the outlet valves may be properly adjusted according to influence of inertia, etc.. For example, the timing of igniting the cylinder units may be automatically properly adjusted by sensors for defining said timing, which is connected to a microprocessor.

In the Second Embodiment, eight internal-combustion engines are employed, but number of the internal-combustion engines is not limited. A plurality of the rotary drive systems of the Second Embodiment may be vertically piled. In this case, the rotary drive systems may be angularly shifted, a couple of the rotary drive systems of the Second Embodiment which include 16 cylinder units, for example, may be vertically piled and mutually shifted 45°. In this example, the cylinder units are ignited with the phase difference of 45°, so that the moving body can be further smoothly moved round. Change of the rotational torque can be reduced, and the moving body can be stably moved. In result, the vibration of the rotary drive system can be much reduced, and greater torque can be generated.

In the Second Embodiment, eight cylinder units are employed, but four cylinder units, which respectively correspond to four piton rods (a pair of the first elongated members and a pair of the second elongated members) and which are driven by introducing and discharging high pressure fluid, may be employed instead of the internal-combustion engines.

The second moving guide may be slidably attached to a pair of the first elongated members; the first moving guide may be slidably attached to a pair of the second elongated members; and the first and second moving guides may be respectively driven by two cylinder units.

(Third Embodiment)

Third Embodiment will be explained with reference to FIGS. 12 and 13.

Figure 12:
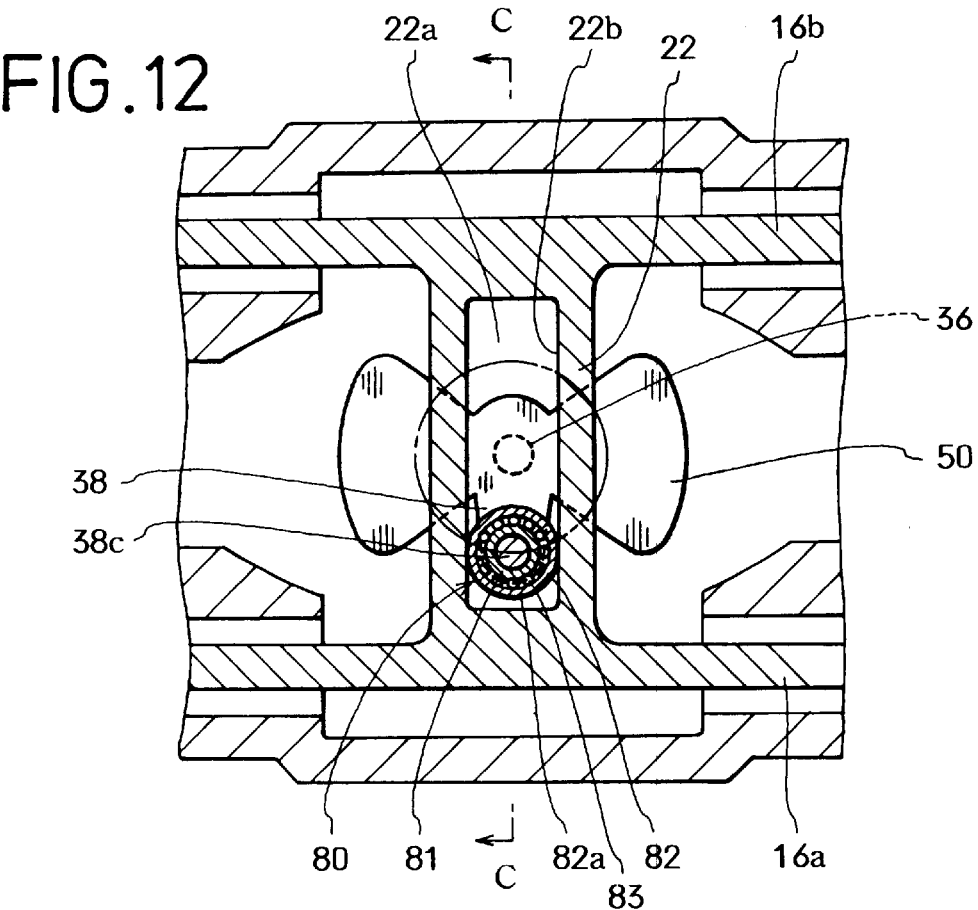
FIG. 12 is a plan sectional view showing an inner mechanism of an engine of Third Embodiment.
Figure 13:
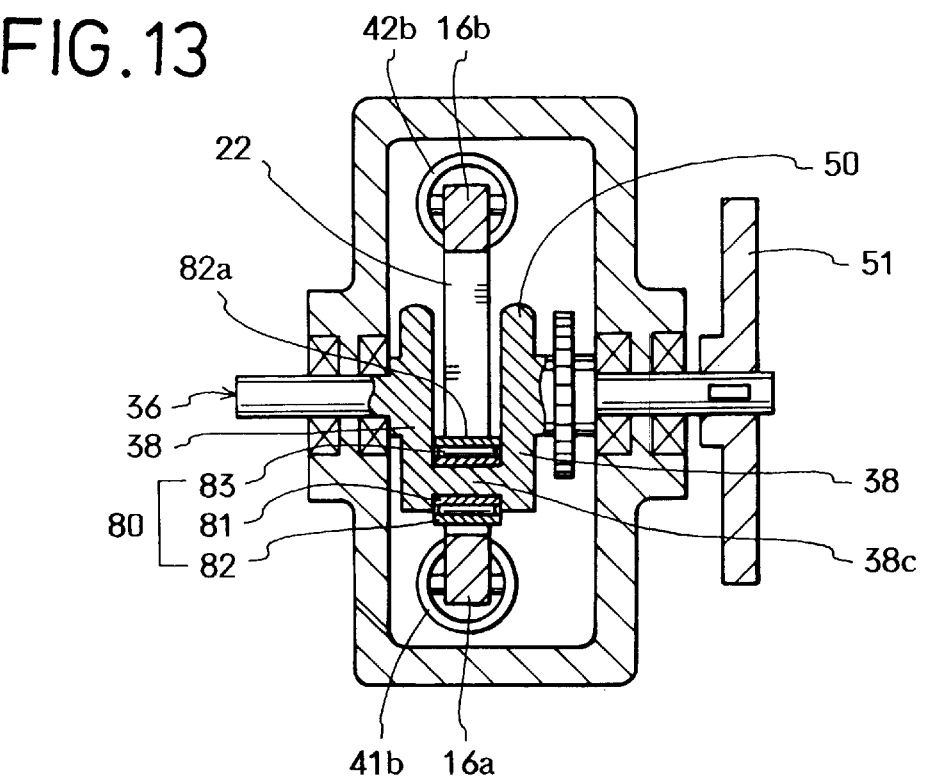
FIG. 13 is a sectional view of the Third Embodiment taken along a line C—C.

FIG. 12 is a plan sectional view of the rotary drive system (engine) of the present embodiment, which shows a main part of an inner mechanism; FIG. 13 is a sectional view taken along a line C—C shown in FIG. 12.

A moving body of the Third Embodiment is different from that of the First Embodiment, other constituting members are same. So the moving body will be explained, and explanation of other constituting members will be omitted.

Unlike the moving body 24 of the First Embodiment, a moving body 80 has a structure of a ball bearing. Frictional resistance of the moving body 80 can be reduced by rolling. The moving body 80 comprises: an inner ring 81; an outer ring 82; and a plurality of rollers 83, which are rotatably provided between the inner ring 81 and the outer ring 82. A part 38c, which is connected with the levers 38, is rotatably pierced through the inner ring 81. An outer circumferential face 82a of the outer ring 82 contacts an inner face 22b of the frame 22a of the Y-guide 22. The ball bearing-type moving body 80 is capable of moving in the frame 22a of the Y-guide 22. In the moving body 80, the frictional resistance can be reduced by the rollers 83; the rotation of the rotary shaft, which is caused by the levers 38, can be smooth. Thus, the linear thrust force can be smoothly converted into the rotation, so that the energy converting efficiency can be increased.

To reduce the frictional resistance of the moving body, a cam follower may be employed instead of the ball bearing-type moving body 80.

In the Third Embodiment, the ball bearing-type moving body 80 is applied to the rotary drive system of the First Embodiment, it may be applied to the Second Embodiment.

(Fourth Embodiment)

Fourth Embodiment, in which a rotary drive system has a valve driving mechanism, will be explained with reference to FIGS. 14 and 15.

Figure 14:
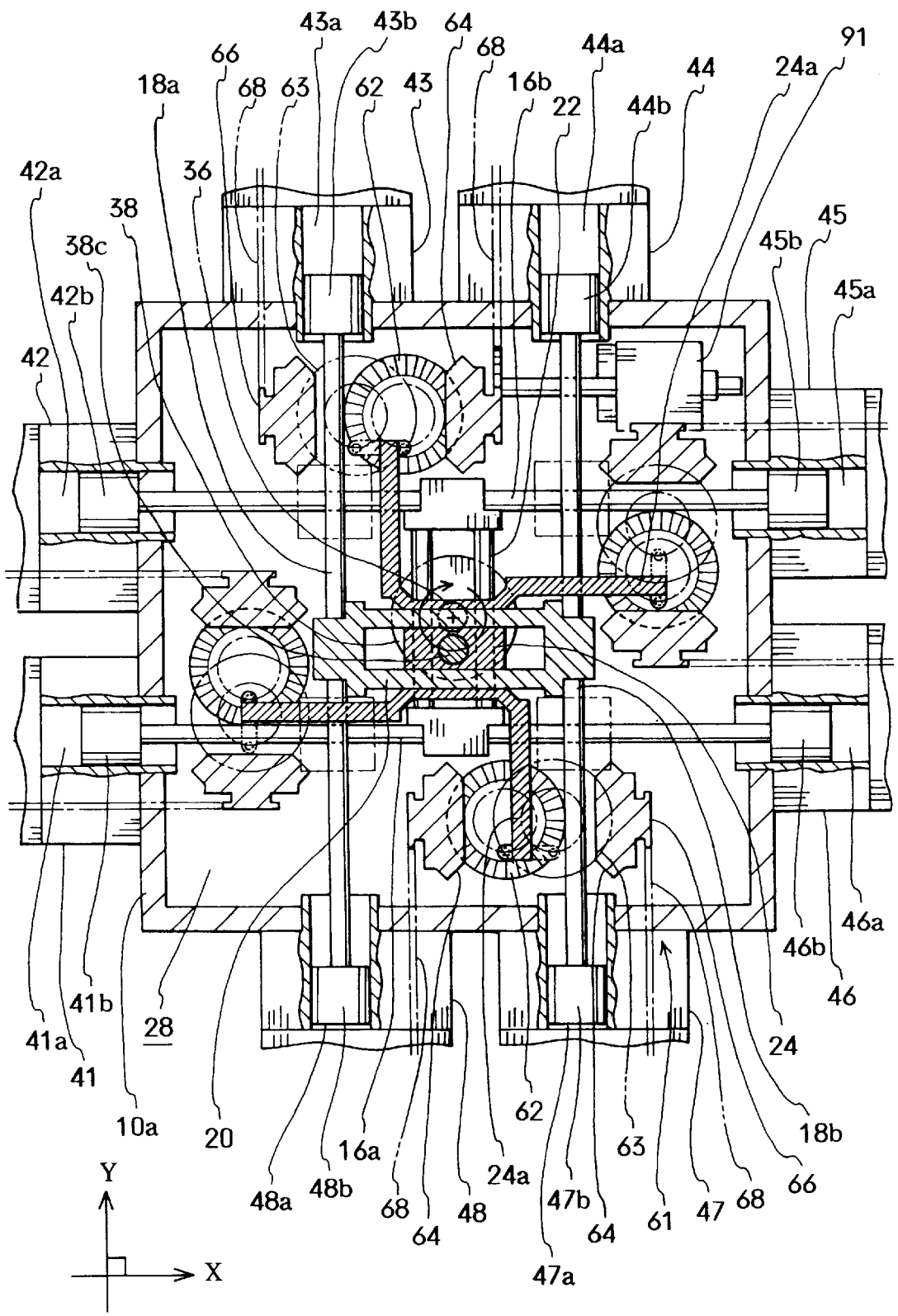
FIG. 14 is a plan sectional view showing an inner mechanism of Fourth Embodiment.

FIG. 14 is a plan sectional view of the rotary drive system (engine) of the present embodiment, which shows a main part of an inner mechanism; FIG. 15 is a sectional view taken along a center line of the rotary drive system shown in FIG. 14. Constituting members which have explained in the Second Embodiment are assigned the same symbols, and explanation will be omitted.

The valve driving mechanism 61 transmits rotating force of bevel gears 62 and 63 so as to actuate the inlet valves and the outlet valves of the cylinder units 41, 42, 43, 44, 45, 46, 47 and 48.

The bevel gears 62 and 63 are capable of respectively rotating about axial lines 62*a* and 63*a*, which are parallel to the rotary shaft 36. Parts 62*b* and 63*b* of the bevel gears 62 and 63 are pivotably connected to the moving body 24. Each bevel gear 62 and 63 is integrated with a sub-rotary shaft and a sub-lever and capable of spinning when the moving body 24 is moved round. Note that, the distance between each axial line 62*a* and 63*a* and each part 62*b* and 63*b* is equal to the radius of the circular orbit on which the moving body 24 is moved round.

A set of the bevel gears 62 and 63 are provided to correspond to each cylinder 41*a, 42*a, 43*a, 44*a, 45*a, 46*a, 47*a* and 48*a*. In FIG. 14, the bevel gears 62, which are shown by solid lines, are pivotably attached to the lower cover 12*b*. The bevel gears 63, which are shown by two-dot chain lines, are pivotably attached to the upper cover 12*a*. The bevel gears 62 and 63 are capable of respectively spinning about the axial lines 62*a* and 63*a*. The parts 62*b* and 63*b* are respectively pivotably attached to front ends of arms 24*a*, which are extended from the moving body 24. Each set of the bevel gears 62 and 63 is pivotably attached to the front end of each arm 24*a*. The distance between each axial line 62*a* and 63*a* and each part 62*b* and 63*b* is equal to the radius of the circular orbit on which the moving body 24 is moved round. Since the arms 24*a* are integrated with the moving body 24, it moves together with the moving body 24. Therefore, the bevel gears 62 and 63 synchronously spin with the rotary shaft 36 when the moving body 24 is moved round.

Bevel gears 64 for transmitting the driving force are pivotably attached to the casing 10. The bevel gears 64 respectively engage with the bevel gears 62 and 63, so they are spun by spinning the bevel gears 62 and 63. Each sprocket 66 is coaxially fixed to each bevel gear 64.

In head sections of each cylinder units 41, 42, 43, 44, 45, 46, 47 and 48, a driven sprocket (not shown) is fixed to an end of a cam shaft. A chain 68 is engaged between the driven sprocket and the sprocket 66. With this structure, the driving force of the bevel gears 62 and 63 can be transmitted to actuate the inlet valves and the outlet valves.

Cams, which are provided to the cam shaft, actuate the inlet valves and the outlet valves with springs, etc., this mechanism is equal to the mechanism employed in the conventional recipro-engines, so explanation will be omitted.

The driving force for actuating the inlet valves and the outlet valves can be properly gained in the rotary drive system. Since the valve driving mechanism is mechanically synchronized, the valve driving mechanism can be highly precisely controlled, and reliability can be increased. In the Fourth Embodiment, the sprockets 66 and the chains 68 are employed as means for transmitting the driving force, but timing pulleys and timing belts, for example, may be employed as the transmitting means.

An oil pump 91 for circulating oil is driven by transmitting the driving force from one of four bevel gears 62. Chains, timing belts, etc. may be employed to transmit the driving force to drive the oil pump as well as the valve driving mechanism.

Figure 15:
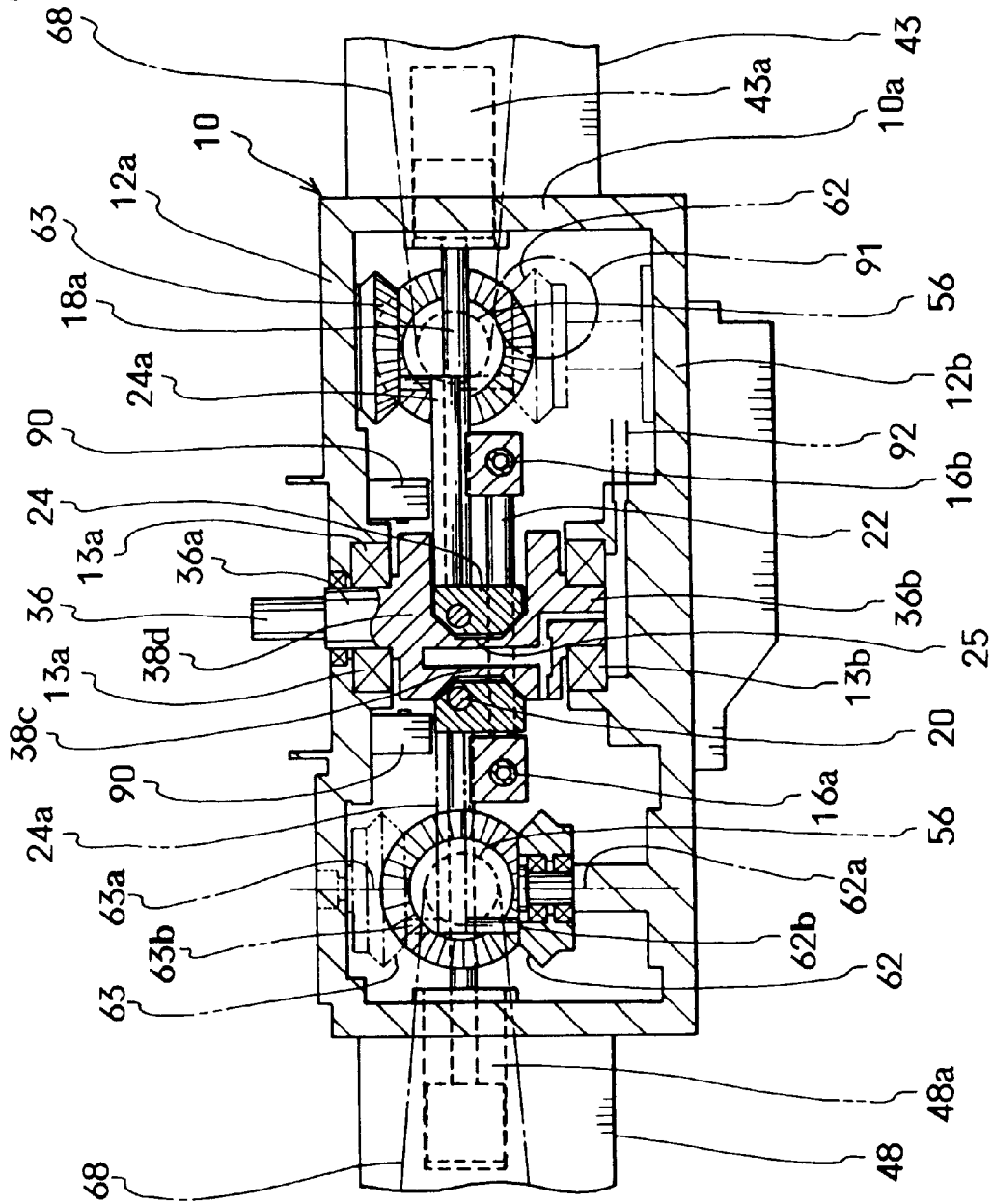
FIG. 15 is a sectional view of the Fourth Embodiment taken along a center line.

Note that, an oil path 92 and sensors 90 for sensing the timing of igniting are shown in FIG. 15.

(Fifth Embodiment)

Fifth Embodiment, in which a plurality of sub-rotary drive systems (engines), each of which is the rotary drive system of the First Embodiment, are vertically piled, will be explained with reference to FIGS. 16–19. In the Fifth Embodiment, a plurality of the rotary shafts are coaxially connected each other.

Figure 16:
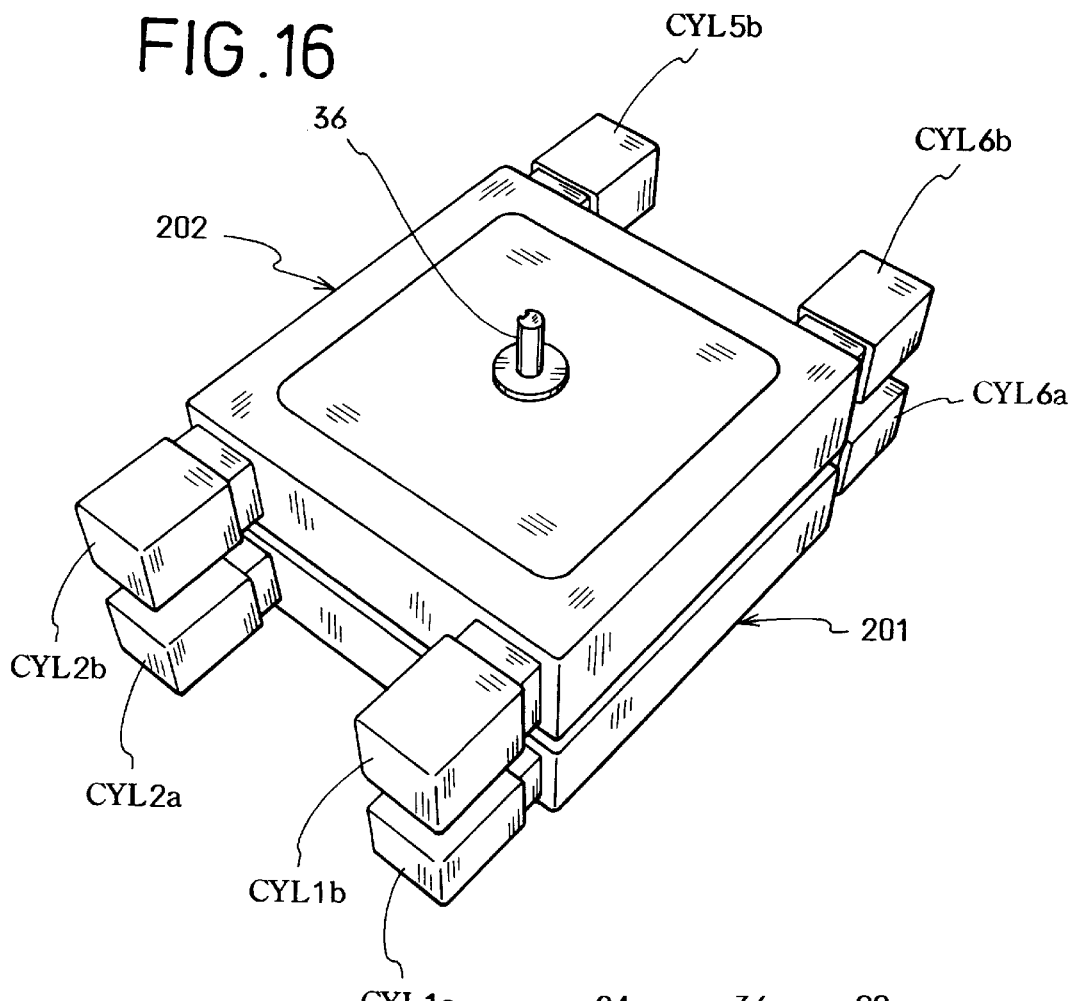
FIG. 16 is a perspective view showing an external shape of Fifth Embodiment.
Figure 17:
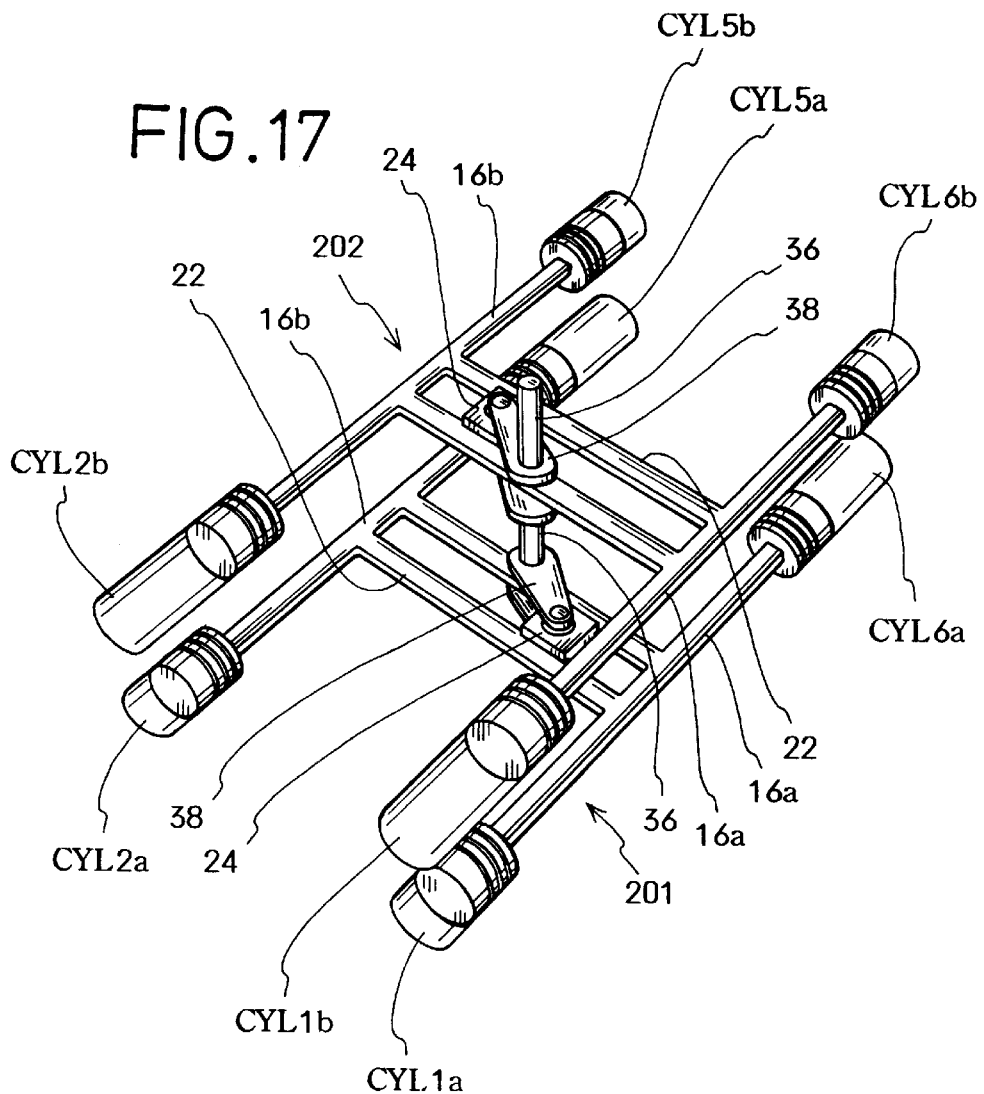
FIG. 17 is a perspective view showing an inner mechanism of the Fifth Embodiment.
Figure 20:
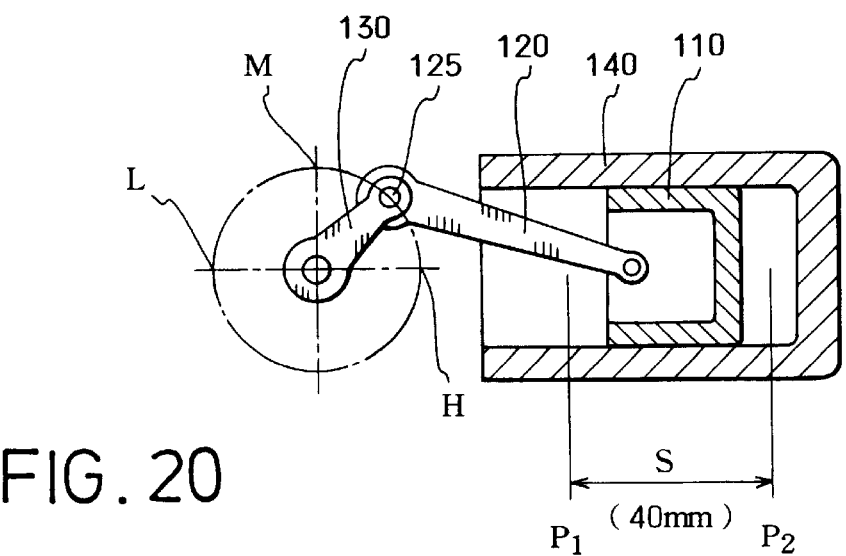
FIG. 20 is an explanation view showing the conventional crank mechanism.

FIG. 16 is a perspective view showing the external appearance of the rotary drive system of the Fifth Embodiment; FIG. 17 is an explanation view showing an inner mechanism of the Fifth Embodiment.

In the Fifth Embodiment, the engine of the First Embodiment is regarded as a sub-engine. A plurality of sub-engines are vertically piled to arrange the pairs of elongated members parallel, and a plurality of the rotary shafts (e.g., two rotary shafts) are coaxially connected by a coupler, etc..

The sub-engine, which is explained in the First Embodiment, comprises: four pistons; and a H-shaped member, which includes the X-piston rods 16*a* and 16*b* and the Y-moving guide 22, and to which the pistons are connected, wherein the pistons are provided in a same plane. The rotary shafts 36 of a couple of the sub-engines (four-cylinder engines) are mutually connected, and two of the sub-engines are vertically piles to arrange the pairs of piston rods parallel. Angular position of the levers 38, which is fixed to the rotary shaft 36, of the lower sub-engine 201 is shifted 180° with respect to that of the levers 38 of upper sub-engine 202. Phase difference of the ignition timing of the sub-engines 201 and 202 is 180°.

Concrete ignition timing will be explained with reference to FIG. 17.

The four cylinders of the sub-engine 201 are CYL1*a*, CYL2*a*, CYL5*a* and CYL6*a*; the four cylinders of the sub-engine 202 are CYL1*b*, CYL2*b*, CYL5*b* and CYL6*b*. Four cylinders of the sub-engine 201 are repeatedly ignited in order of CYL1*a*, CYL5*a*, CYL2*a*, CYL6*a*; four cylinders of the sub-engine 202 are repeatedly ignited in order of CYL5*b*, CYL1*b*, CYL6*b*, CYL2*b*.

By the 180° of phase difference of ignition timing between the sub-engines 201 and 202, phase 180°, two cylinders, which are diagonally located, are simultaneously ignited, so couples of forces are properly generated. Namely, shocks applying to the rotary shaft mutually offset each other, so that vibration disappears, stable rotation can be gained, and greater rotational torque can be gained efficiently.

In the Fifth Embodiment, the engine has eight cylinder units, but the cylinder units may be operated with two valve driving mechanisms, which includes the inlet valves and the outlet valves, so the structure can be simple.

In the Fifth Embodiment, the angular positions of the levers 38 of the sub-engines 201 and 202 with respect to the rotary shafts 36 are mutually shifted 180°. But the angular difference of the levers 38 and the phase difference of the ignition timing are not limited, they may be 90°, etc.. In the case of the difference of 90°, the driving forces mutually shifted 90° can be properly combined as well as the Second Embodiment, so that the stable and balanced rotation can be gained. In this case, unlike the Second Embodiment in which one set of the levers are employed, two sets of the levers are employed.

In the case of piling three sub-engines, each couple of the levers are arranged with the angular difference of 120°. The phase difference of the ignition timing of three sub-engines is 120°, so that the driving forces of the sub-engines can be properly combined and proper rotation can be gained.

In the case of piling four or more sub-engines, the proper rotation can be gained by properly selecting the angular difference among the levers 38 and the phase difference of the ignition timing.

(Sixth Embodiment)

Sixth Embodiment will be explained with reference to FIG. 18.

Figure 18:
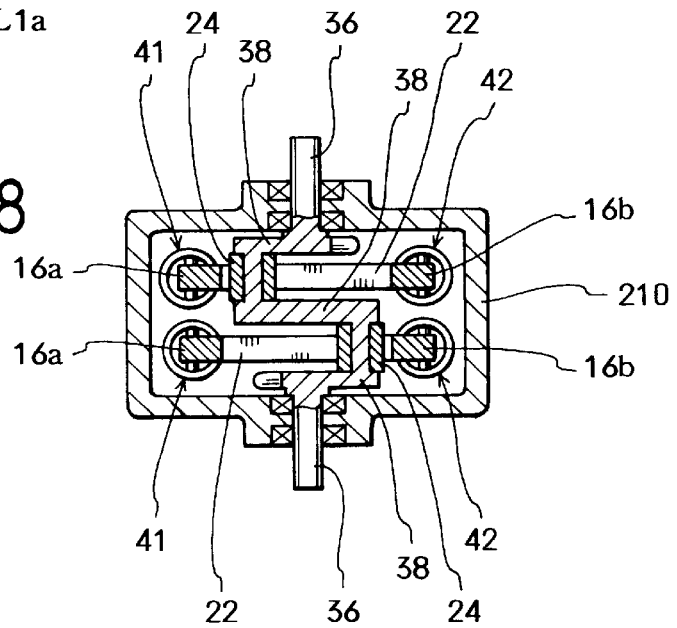
FIG. 18 is a perspective view showing an inner mechanism of Sixth Embodiment.

FIG. 18 is a sectional view of the Sixth Embodiment. In the Sixth Embodiment, two sub-rotary drive systems are built in one casing 210. The present embodiment is different from the Fifth Embodiment in which two sub-engines are piled and two rotary shafts are connected. Note that, constituting members shown in the Fifth Embodiment are assigned the same symbols and explanation will be omitted.

In one casing 210, the levers 38 of the two sub-rotary drive systems are directly connected as shown. The sub-rotary drive systems can be operated in the same space, so thickness of the rotary drive system can be thinner. And some constituting members are commonly used, so the structure of the rotary drive system can be simpler.

(Seventh Embodiment)

Figure 19:
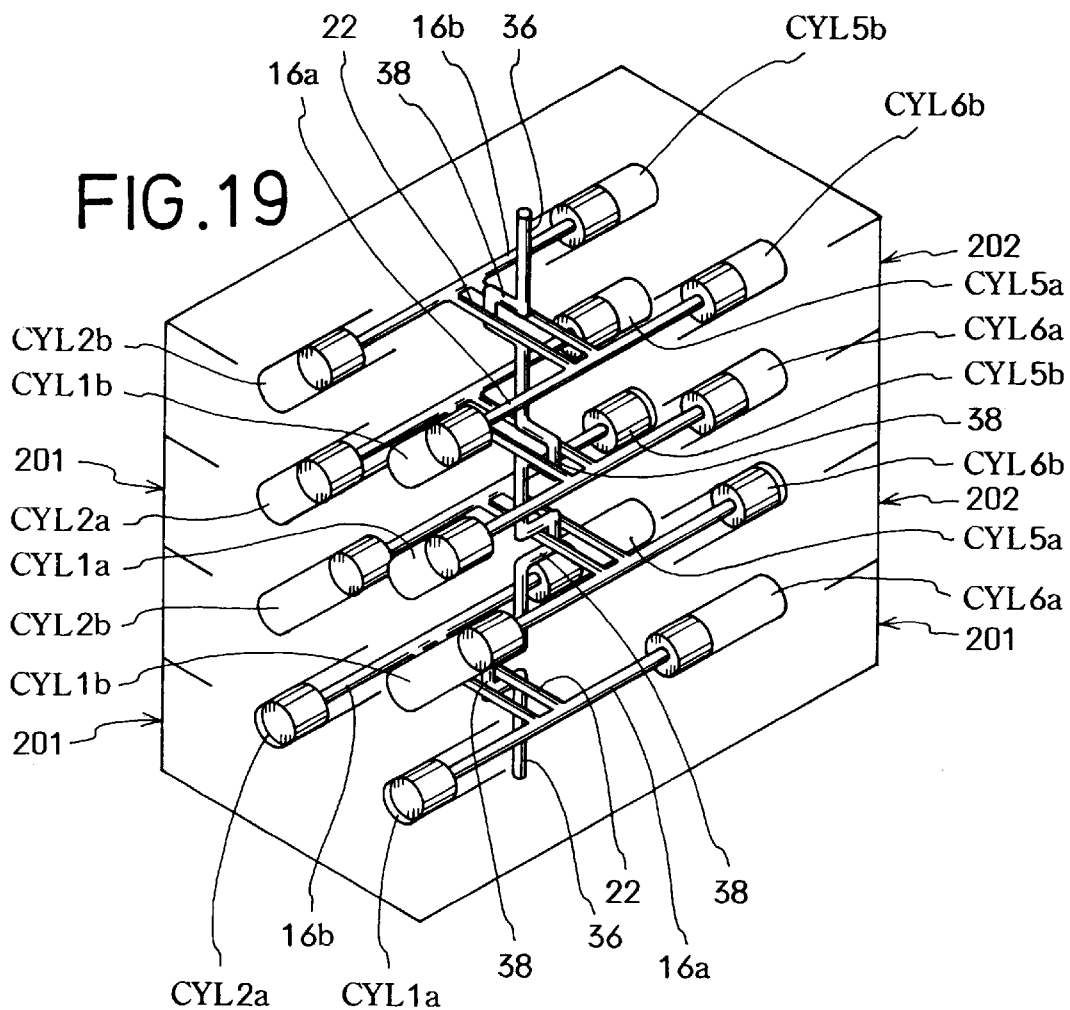
FIG. 19 is a perspective view showing an inner mechanism of Seventh Embodiment.
Figure 21:
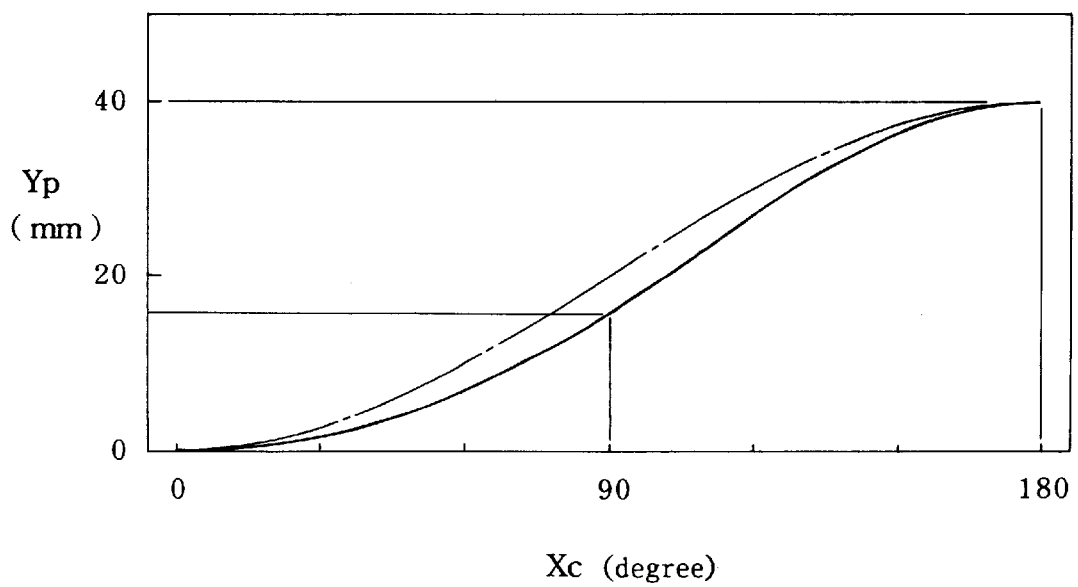
FIG. 21 is a graph showing the relationship between the rotational angle of the crank and the movement of the piston shown in FIG. 20.
Figure 22:
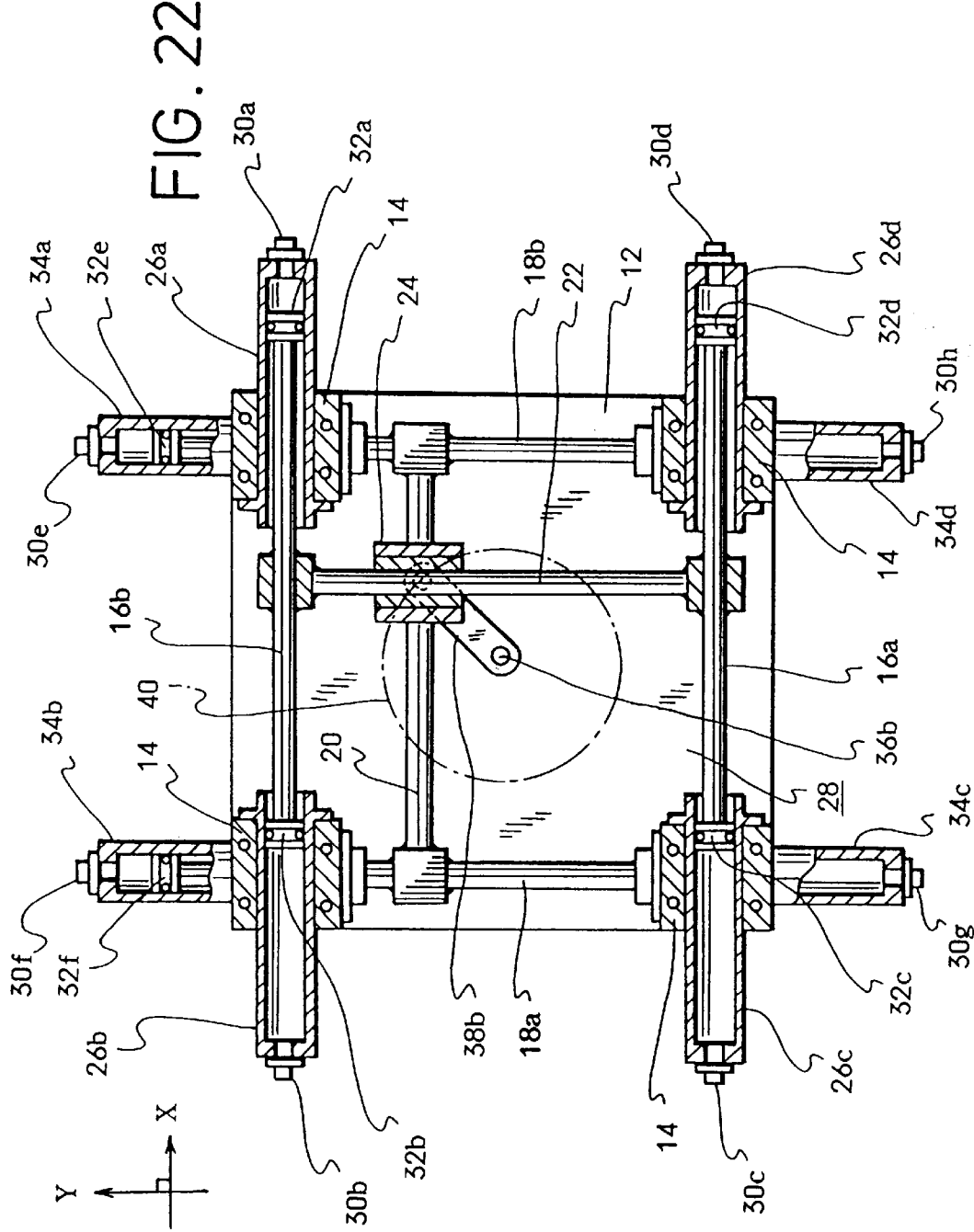
FIG. 22 is a plan sectional view of the conventional rotary drive system.
Figure 23:
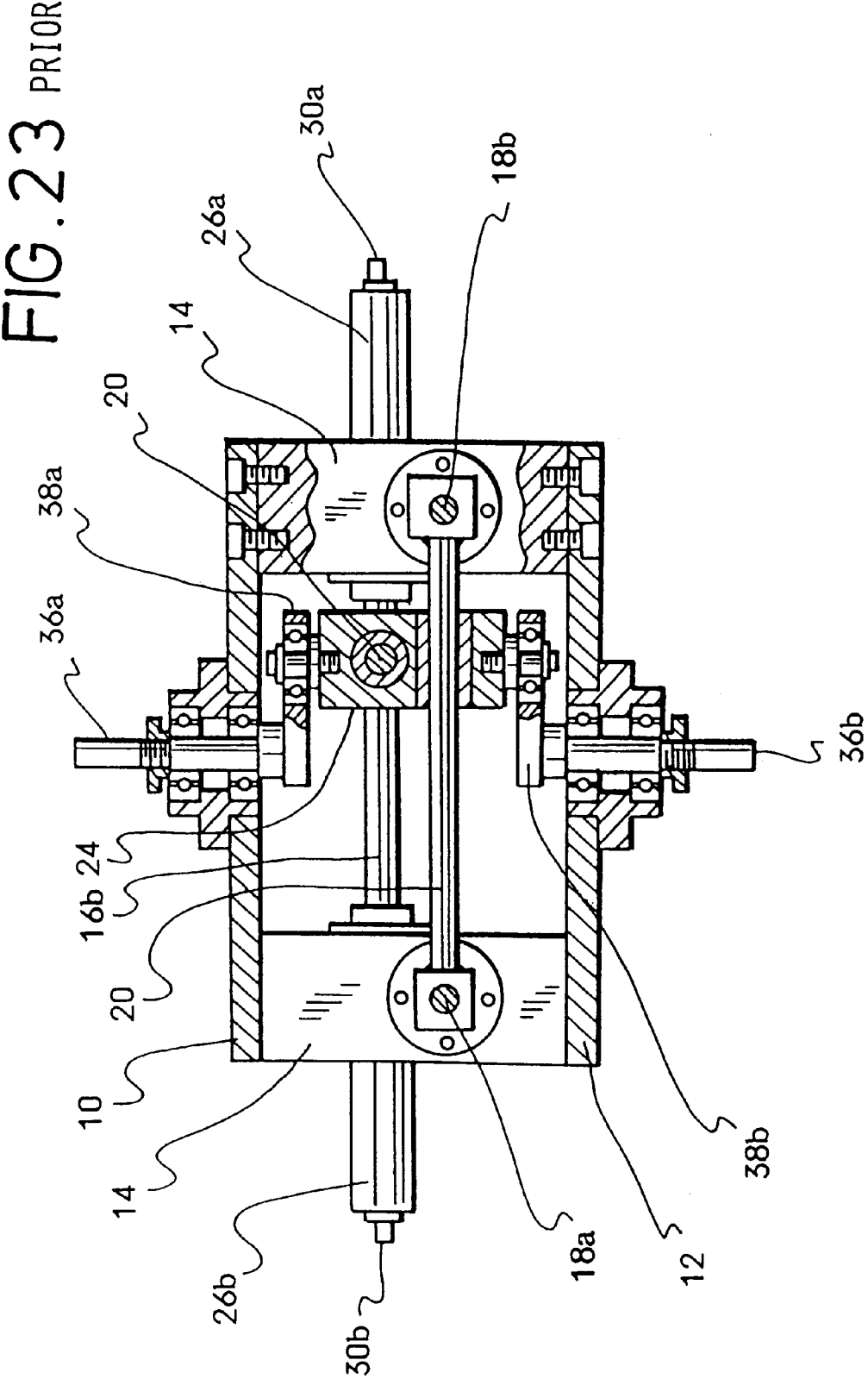
FIG. 23 is a side sectional view of the conventional rotary drive system.

Seventh Embodiment will be explained with reference to FIG. 19. In the Seventh Embodiment, four sub-engines are vertically piled. FIG. 19 is an explanation view showing an inner mechanism of the rotary drive system.

In the Seventh Embodiment, the engines of the Fifth Embodiment are vertically piled with 90° of the levers' angular difference. The phase difference of the ignition timing is 90°, too. Constituting members are the same as those of the Fifth Embodiment, so the same symbols are assigned and explanation will be omitted.

By the engine of the Seventh Embodiment, couples of forces are properly generated, so that proper rotation without vibration can be gained.

Angular positions of the levers 38 of the sub-engines with respect to the rotary shaft 36 and the phase difference of the ignition timing thereof are 90°. Thus, the driving forces, whose phases are mutually shifted 90°, can be properly combined as well as the Second Embodiment, so that balanced and stable rotation can be gained.

Namely, the engine of the Seventh Embodiment has advantages of the engines of the Second and Fifth Embodiments.

Piling four sub-engines is not limited to the shown example, they may be piled to mutually angularly shifted 90°. If one of the adjacent sub-engines are inverted, the structure can be a balanced symmetrical structure.

In the engines of the present invention, manners of piling the sub-engines are not limited to the Fifth-Seventh Embodiments in which the pairs of elongated members are arranged parallel, they may be piled with optional angular differences to form the engine having greater piston displacement. For example, three sub-engines may be piled with 120° of the angular differences and 120° of the phase difference of the ignition timing.

In the case of piling two sub-engines with 90° of the angular difference, two sets of the levers, which constitute the cranks, are included, and proper rotational torque can be gained from the rotary shafts as well as the Second Embodiment.

By piling a plurality of the sub-engines, the vibration in the engine can be reduced; a high power engine can be realized; parts can be used commonly; manufacturing steps can be reduced; and manufacturing cost can be reduced.

In each embodiment, the four-cycle internal-combustion engines are employed as the driving mechanisms, but two-cycle internal-combustion engines may be employed as the driving mechanisms.

If the rotary shaft is rotated by an external unit to move the moving body round the rotary shaft, fluid in the cylinder units can be discharged or jetted out from the valves of the cylinder units. In this case, the rotary drive system can be used as a pump, a compressor, etc.. In the rotary drive system of the present invention, the rotation can be converted into the linear movement, so the fluid can be stably discharged or jetted out from the cylinder units.

In the rotary drive system, the cylinder units execute the linear movement, so the rotary drive system can be used as a hydraulic motor, a pneumatic, a vacuum generator for sucking the fluid, etc..

Preferred embodiments of the present invention have been described, but the present invention is not limited to the embodiments, many modification can be allowed without deviating the spirit of the invention.

I claim:

1. A rotary drive system, comprising:

a pair of elongated members being arranged parallel in a first direction and capable of moving in the first direction;

a moving guide being spanned between said elongated members, said moving guide being arranged in a second direction perpendicular to the first direction, said moving guide being capable of moving in the first direction together with said pair of elongated members;

a moving body being capable of moving in the second direction along said moving guide;

a rotary shaft being capable of rotating about an axial line, which is perpendicular to the first direction and the second direction;

a lever having one part pivotably connected with said moving body and another part being fixed to said rotary shaft, whereby said lever rotates said rotary shaft when said moving body moves round;

a driving mechanism for moving said moving guide in the first direction; and a control mechanism for stabilizing rotational speed of said rotary shaft;

wherein said moving guide is integrated with said pair of elongated members, and wherein said moving body is moved, in the second direction, without rotating about its own axis, in a frame which is provided to said moving guide and elongated in the second direction, side faces of said moving body are flat faces parallel to inner side faces of said frame and capable of respectively sliding on the inner side faces thereof.

2. The rotary drive system according to claim 1, wherein said driving mechanism includes a cylinder unit, which has: an inlet valve for opening and closing an introducing part, which introduces a fluid into said cylinder unit; and an outlet valve for opening and closing a discharging part, which discharges the fluid therefrom.

3. The rotary drive system according to claim 1 or 2, wherein said control mechanism is a counter weight and/or a flywheel.

4. A rotary drive system, comprising:

a pair of first elongated members being arranged parallel in a first direction and capable of moving in the first direction;

a pair of second elongated members being arranged parallel in a second direction perpendicular to the first direction and capable of moving in the second direction;

a first moving guide being integrally spanned between said second elongated members, said first moving guide being arranged in the first direction, said first moving guide being capable of moving in the second direction together with said pair of second elongated members;

a second moving guide being integrally spanned between said first elongated members, said second moving guide being arranged in the second direction, said second moving guide being capable of moving in the first direction together with said pair said first elongated members;

a moving body being capable of moving in the first direction in a first frame, which is provided to said first moving guide and elongated in the first direction, and moving in the second direction in a second frame, which is provided to said second moving guide and elongated in the second direction, wherein a pair of side faces of said moving body are flat faces parallel to inner side faces of said first frame and capable of respectively sliding on the inner side faces thereof, another pair of side faces of said moving body are flat faces parallel to inner side faces of said second frame and capable of respectively sliding on the inner side faces thereof, whereby said moving body is located in a square space, which is formed at a cross point of said first frame and second frame, and capable of moving in a rectangular plane enclosed by said first elongated members and said second elongated members;

a rotary shaft being capable of rotating about an axial line, which is perpendicular to the first direction and the second direction;

a lever having one part pivotably connected with said moving body and another part being fixed to said rotary shaft, whereby said lever rotates said rotary shaft when said moving body moves round;

a first driving mechanism for moving said second moving guide in the first direction; and a second driving mechanism for moving said first moving guide in the second direction.

5. The rotary drive system according to claim 4, wherein said first driving mechanism and said second driving mechanism respectively include cylinder units, each of which has: an inlet valve for opening and closing an introducing part, which introduces a fluid into said cylinder unit; and an outlet valve for opening and closing a discharging part, which discharges the fluid therefrom.

6. An engine, comprising:

a pair of elongated members being arranged parallel in a first direction, said elongated members being capable of moving in the first direction;

a moving guide being arranged in a second direction perpendicular to the first direction, both ends of said moving guide are respectively fixed to said elongated members, whereby said moving guide is moved in the first direction together with said elongated members;

a moving body being capable of moving in the second direction along said moving guide;

a rotary shaft being capable of rotating about an axial line, which is perpendicular to the first direction and the second direction;

a lever having one part pivotably connected with said moving body and another part being fixed to said rotary shaft, whereby said lever rotates said rotary shaft when said moving body moves round;

a driving mechanism for moving said moving guide in the first direction; and a control mechanism for stabilizing rotational speed of said rotary shaft;

wherein said driving mechanism includes cylinder units, which are driven by fluid pressure, each of which is connected with each end of said elongated members, and which are capable of moving said elongated members and said moving guide in the first direction;

wherein said moving guide is integrated with said pair of elongated members; and wherein said moving body is moved, in the second direction, without rotating about its own axis, in a frame which is provided to said moving guide and elongated in the second direction, side faces of said moving body are flat faces parallel to inner side faces of said frame and capable of respectively sliding on the inner side faces thereof.

7. The engine according to claim 6, wherein said control mechanism is a counter weight and/or a flywheel.

8. The engine according to claim 6, wherein said cylinder units are a first cylinder unit and a second cylinder unit, which are respectively connected with one ends of said elongated members, and a fifth cylinder unit and a sixth cylinder unit, which are respectively connected with the other ends of said elongated members, and said cylinder units are repeatedly actuated in order of the first cylinder unit, the fifth cylinder unit, the second cylinder unit and the sixth cylinder unit.

9. An engine, comprising:

a pair of first elongated members being arranged parallel in a first direction and capable of moving in the first direction;

a pair of second elongated members being arranged parallel in a second direction perpendicular to the first direction and capable of moving in the second direction;

a first moving guide being arranged in the first direction and integrally spanned between said pair of second elongated members, whereby said first moving guide is moved in the second direction together with said second elongated members;

a second moving guide being arranged in the second direction and integrally spanned between said pair of first elongated members, whereby said second moving guide is moved in the first direction together with said first elongated members;

a moving body being capable of moving in the first direction in a first frame, which is provided to said first moving guide and elongated in the first direction, and moving in the second direction in a second frame, which is provided to said second moving guide and elongated in the second direction, wherein a pair of side faces of said moving body are flat faces parallel to inner side faces of said first frame and capable of respectively sliding on the inner side faces thereof, another pair of side faces of said moving body are flat faces parallel to inner side faces of said second frame and capable of respectively sliding on the inner side faces thereof, whereby said moving body is located in a square space, which is formed at a cross point of said first frame and second frame, whereby said moving body is capable of moving in a rectangular plane enclosed by said first elongated members and said second elongated members;

a rotary shaft being capable of rotating about an axial line, which is perpendicular to the first direction and the second direction;

a lever having one part pivotably connected with said moving body and another part being fixed to said rotary shaft, whereby said lever rotates said rotary shaft when said moving body moves round;

a first driving mechanism for moving said second moving guide in the first direction; and a second driving mechanism for moving said first moving guide in the second direction;

wherein said first driving mechanism and said second driving mechanism include cylinder units, which are driven by fluid pressure, and wherein each of said cylinder units is connected with each end of said first elongated members and said second elongated members, said cylinder units move said first elongated members and said second moving guide in the first direction and move said second elongated members and said first moving guide in the second direction.

10. The rotary drive system according to claim 2 or 6, wherein said cylinder units discharge the fluid when said rotary shaft is rotated by the round movement of said moving body.

11. A rotary drive system, comprising a plurality of sub-rotary drive systems, each of which is the rotary drive system of claim 1, wherein said sub-rotary drive systems are piled and whose rotary shafts are coaxially connected.

12. The rotary drive system according to claim 11, wherein said sub-rotary drive systems are piled to arrange said pairs of elongated members parallel, and angular positions of said levers, with respect to said coaxial rotary shafts, are mutually different.

13. The rotary drive system according to claim 12, wherein a couple of said sub-rotary drive systems are piled, and the difference of the angular positions of said levers is 180°.

14. An engine, comprising a plurality of sub-engine, each of which is the engine of claim 6, wherein said sub-engines are piled and whose rotary shafts are coaxially connected.

15. The engine according to claim 14, wherein said sub-engine are piled to arrange said pairs of elongated members parallel, and angular positions of said levers, with respect to said coaxial rotary shafts, are mutually different.

16. The rotary drive system according to claim 15, wherein a couple of said engines are piled, the difference of the angular positions of said levers is 180°, and phase difference of actuating said sub-engines is 180°.

17. An engine, comprising:

a pair of first elongated members being arranged parallel in a first direction, said first elongated members being capable of moving in the first direction;

a pair of second elongated members being arranged parallel in a second direction perpendicular to the first direction, said second elongated members being capable of moving in the second direction;

a first moving guide being arranged in the first direction and integrally spanned between said pair of second elongated members, whereby said first moving guide is moved in the second direction together with said second elongated members;

a second moving guide being arranged in the second direction and integrally spanned between said pair of first elongated members, whereby said second moving guide is moved in the first direction together with said first elongated members;

a moving body being capable of moving in the first direction in a first frame, which is provided to said first moving guide and elongated in the first direction, and moving in the second direction in a second frame, which is provided to said second moving guide and elongated in the second direction, wherein a pair of side faces of said moving body are flat faces parallel to inner side faces of said first frame and capable of respectively sliding on the inner side faces thereof, another pair of side faces of said moving body are flat faces parallel to inner side faces of said second frame and capable of respectively sliding on the inner side faces thereof, whereby said moving body is located in a square space, which is formed at a cross point of said first frame and second frame, whereby said moving body is capable of moving in a rectangular plane enclosed by said first elongated members and said second elongated members;

a rotary shaft being capable of rotating about an axial line, which is perpendicular to the first direction and the second direction;

a lever having one part pivotably connected with said moving body and another part being fixed to said rotary shaft, whereby said lever rotates said rotary shaft when said moving body moves round;

a first driving mechanism for moving said second moving guide in the first direction, said first driving mechanism including cylinder units, which are driven by fluid pressure;

a second driving mechanism for moving said first moving guide in the second direction, said second driving mechanism including cylinder units, which are driven by fluid pressure; and an actuating unit for actuating the cylinder units of said first driving mechanism and second driving mechanism;

wherein each of said cylinder units is connected with each end of said first elongated members and said second elongated members, said cylinder units move said first elongated members and said second moving guide in the first direction and move said second elongated members and said first moving guide in the second direction; and wherein said cylinder units are: a first cylinder unit and a second cylinder unit, which are respectively connected with one ends of said first elongated members; a third cylinder unit and a fourth cylinder unit, which are respectively connected with one ends of said second elongated members; a fifth cylinder unit and a sixth cylinder unit, which are respectively connected with the other ends of said first elongated members; an a seventh cylinder unit and a eighth cylinder unit, which are respectively connected with the other ends of said second elongated members, and said cylinder units are repeatedly actuated, by said actuating unit, in order of the first cylinder unit, the third cylinder unit, the fifth cylinder unit, the seventh cylinder unit, the second cylinder unit, the fourth cylinder unit, the sixth cylinder unit and the eighth cylinder unit.

18. An engine, comprising:

a pair of first elongated members being arranged parallel in a first direction, said first elongated members being capable of moving in the first direction;

a pair of second elongated members being arranged parallel in a second direction perpendicular to the first direction, said second elongated members being capable of moving in the second direction;

a first moving guide being arranged in the first direction and integrally spanned between a pair of said second elongated members, whereby said first moving guide is moved in the second direction together with said second elongated members;

a second moving guide being arranged in the second direction and integrally spanned between a pair of said first elongated members, whereby said second moving guide is moved in the first direction together with said first elongated members;

a moving body being capable of moving in the first direction in a first frame, which is provided to said first moving guide and elongated in the first direction, and moving in the second direction in a second frame, which is provided to said second moving guide and elongated in the second direction, wherein a pair of side faces of said moving body are flat faces parallel to inner side faces of said first frame and capable of respectively sliding on the inner side faces thereof, another pair of side faces of said moving body are flat faces parallel to inner side faces of said second frame and capable of respectively sliding on the inner side faces thereof, whereby said moving body is located in a square space, which is formed at a cross point of said first frame and second frame, whereby said moving body is capable of moving in a rectangular plane enclosed by said first elongated members and said second elongated members;

a rotary shaft being capable of rotating about an axial line, which is perpendicular to the first direction and the second direction;

a lever whose one part is pivotably connected with said moving body and whose another part is fixed to said rotary shaft, whereby said lever rotates said rotary shaft when said moving body moves round;

a first driving mechanism for moving said second moving guide in the first direction, said first driving mechanism including cylinder units, which are driven by fluid pressure;

a second driving mechanism for moving said first moving guide in the second direction, said second driving mechanism including cylinder units, which are driven by fluid pressure; and an actuating unit for actuating the cylinder units of said first driving mechanism and second driving mechanism;

wherein each of said cylinder units is connected with each end of said first elongated members and said second elongated members, said cylinder units move said first elongated members and said second moving guide in the first direction and move said second elongated members and said first moving guide in the second direction; and wherein said cylinder units are: a first cylinder unit and a second cylinder unit, which are respectively connected with one ends of said first elongated members; a third cylinder unit and a fourth cylinder unit, which are respectively connected with one ends of said second elongated members; a fifth cylinder unit and a sixth cylinder unit, which are respectively connected with the other ends of said first elongated members; and a seventh cylinder unit and a eighth cylinder unit, which are respectively connected with the other ends of said second elongated members, and said cylinder units are repeatedly actuated, by said actuating unit, in order of the first cylinder unit and the second cylinder unit; the third cylinder unit and the fourth cylinder unit; the fifth cylinder unit and the sixth cylinder unit; and the seventh cylinder unit and the eighth cylinder unit.

* * * * *